(12) United States Patent
Wang et al.

(10) Patent No.: US 12,256,072 B2
(45) Date of Patent: Mar. 18, 2025

(54) VIDEO DECODING METHOD AND APPARATUS, COMPUTERREADABLE MEDIUM, AND ELECTRONIC DEVICE

(71) Applicant: TENCENT TECHNOLOGY (SHENZHEN) COMPANY LIMITED, Shenzhen (CN)

(72) Inventors: Liqiang Wang, Shenzhen (CN); Xiaozhong Xu, Shenzhen (CN); Shan Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 260 days.

(21) Appl. No.: 17/940,467

(22) Filed: Sep. 8, 2022

(65) Prior Publication Data

US 2023/0007254 A1 Jan. 5, 2023

Related U.S. Application Data

(63) Continuation of application No. PCT/CN2021/112355, filed on Aug. 12, 2021.

(30) Foreign Application Priority Data

Aug. 21, 2020 (CN) .......................... 202010855608.8

(51) Int. Cl.
*H04N 19/12* (2014.01)
*H04N 19/124* (2014.01)
(Continued)

(52) U.S. Cl.
CPC ........... *H04N 19/12* (2014.11); *H04N 19/124* (2014.11); *H04N 19/13* (2014.11); *H04N 19/176* (2014.11); *H04N 19/70* (2014.11)

(58) Field of Classification Search
CPC .. H04N 19/119; H04N 19/124; H04N 19/176; H04N 19/105; H04N 19/122;
(Continued)

(56) References Cited

U.S. PATENT DOCUMENTS 7,330,509 B2 2/2008 Lu et al.
7,983,496 B2 7/2011 Liu et al.
(Continued)

FOREIGN PATENT DOCUMENTS

CN 101771868 A 7/2010
CN 101895756 A 11/2010
(Continued)

OTHER PUBLICATIONS

The World Intellectual Property Organization (WIPO) International Search Report for PCT/CN2021/112355 Nov. 12, 2021 8 Pages (including translation).
(Continued)

*Primary Examiner* — Nathnael Aynalem
(74) *Attorney, Agent, or Firm* — ANOVA LAW GROUP, PLLC

(57) ABSTRACT

A video decoding method includes performing entropy decoding processing on a code block of a video image frame of a video image frame sequence, to obtain a quantization coefficient block of residual data corresponding to the code block; collecting statistics of quantization coefficients in a target region in the quantization coefficient block, to obtain a quantization coefficient statistical value; selecting a transform matrix combination corresponding to the quantization coefficient statistical value; and performing inverse transform processing on an inverse quantization result of the quantization coefficient block based on the selected trans-
(Continued)

form matrix combination, to obtain reconstructed residual data, the reconstructed residual data being used for video image reconstruction.

17 Claims, 7 Drawing Sheets

(51) Int. Cl.
*H04N 19/13* (2014.01)
*H04N 19/176* (2014.01)
*H04N 19/70* (2014.01)

(58) Field of Classification Search
CPC ...... H04N 19/13; H04N 19/186; H04N 19/42; H04N 19/573; H04N 19/587; H04N 19/593; H04N 19/597; H04N 19/61; H04N 19/625; H04N 19/649; H04N 19/91; H04N 19/12; H04N 19/126; H04N 19/129; H04N 19/136; H04N 19/159; H04N 19/18; H04N 19/70; H04N 19/60
USPC .......................................... 375/240–240.29
See application file for complete search history.

(56) References Cited

U.S. PATENT DOCUMENTS

| | | | |
|---|---|---|---|
| 8,085,852 B2 | 12/2011 | Liu et al. | |
| 8,238,442 B2 | 8/2012 | Liu | |
| 8,526,495 B2 | 9/2013 | Liu et al. | |
| 9,049,452 B2 | 6/2015 | Liu et al. | |
| 9,363,511 B2 | 6/2016 | Zhang et al. | |
| 9,769,472 B2 | 9/2017 | Liu et al. | |
| 10,136,144 B2 | 11/2018 | Liu et al. | |
| 10,205,968 B2 | 2/2019 | Liu et al. | |
| 10,397,569 B2 | 8/2019 | Liu et al. | |
| 10,455,231 B2 | 10/2019 | Xu et al. | |
| 10,511,834 B2 | 12/2019 | Xiaozhong et al. | |
| 10,542,253 B2 | 1/2020 | Liu et al. | |
| 10,567,752 B2 | 2/2020 | Zhao et al. | |
| 10,575,013 B2 | 2/2020 | Liu et al. | |
| 10,582,195 B2 | 3/2020 | Liu et al. | |
| 10,587,881 B2 | 3/2020 | Xiaozhong et al. | |
| 10,587,885 B2 | 3/2020 | Ye et al. | |
| 10,595,019 B2 | 3/2020 | Chernyak et al. | |
| 10,609,384 B2 | 3/2020 | Chen et al. | |
| 10,609,402 B2 | 3/2020 | Zhao et al. | |
| 10,609,403 B2 | 3/2020 | Xu et al. | |
| 10,666,968 B2 | 5/2020 | Xiaozhong et al. | |
| 2011/0211636 A1 | 9/2011 | Yamada et al. | |
| 2011/0268183 A1 | 11/2011 | Sole et al. | |
| 2017/0064335 A1 | 3/2017 | Na et al. | |
| 2017/0094271 A1 | 3/2017 | Liu et al. | |
| 2017/0223381 A1 | 8/2017 | Yang et al. | |
| 2018/0199037 A1 | 7/2018 | Philippe | |
| 2018/0262777 A1* | 9/2018 | Filippov | H04N 19/60 |
| 2020/0404257 A1* | 12/2020 | Filippov | H04N 19/593 |
| 2021/0084304 A1* | 3/2021 | Schwarz | H04N 19/105 |
| 2022/0094930 A1 | 3/2022 | Zhang et al. | |
| 2022/0321886 A1* | 10/2022 | Schwarz | H04N 19/186 |

FOREIGN PATENT DOCUMENTS

| | | |
|---|---|---|
| CN | 102210151 A | 10/2011 |
| CN | 103096052 A | 5/2013 |
| CN | 107710763 A | 2/2018 |
| CN | 110708552 A | 1/2020 |
| CN | 112543337 A | 3/2021 |
| CN | 112565751 A | 3/2021 |
| CN | 113950829 A | 1/2022 |
| EP | 2991352 A1 | 3/2016 |
| JP | 2013034141 A | 2/2013 |
| JP | 2020108179 A | 7/2020 |
| WO | 2020050651 A1 | 3/2020 |

OTHER PUBLICATIONS

China National Intellectual Property Administration (CNIPA) Office Action 1 for 202010855608.8 Jul. 26, 2022 18 Pages (including translation).
Benjamin Bross et al. "General Video Coding Technology in Responses to the Joint Call for Proposals on Video Compression with Capability beyond HEVC", 2019, vol. 30, No. 5, IEEE Transactions on Circuits and Systems for Video Technology.
Shan Liu et al. "Overview of HEVC extensions on screen content coding", vol. 4. 2015, Cambridge University Press.
Shan Liu et al. "Nonlinear motion-compensated interpolation for low-bit-rate video", Applications of Digital Image Processing XXIII 4115, 203-213.
Shan Liu et al. "Global/Local Motion-Compensated Frame Interpolation for LowBitrate Video", Journal of Visual Communication and Image Representation.
Shan Liu et al. "Bit-depth scalable coding for high dynamic range video", 2008, vol. 6822. Journal of Visual Communication and Image Representation.
Dong Liu et al. "Deep Learning-Based Technology in Responses to the Joint Call for Proposals on Video Compression with Capability beyond HEVC" 2019, IEEE Transactions on Circuits and Systems for Video Technology.
Ximin Zhang et al. "Intra mode coding in HEVC standard", p. 1-6, 2012 Visual Communications and Image Processing.
Han Zhu et al. "Residual convolutional neural network based in-loop filter with intra and inter frames processed respectively for AVS3" Jul. 2020, 2020 IEEE International Conference on Multimedia & Expo Workshops (ICMEW), London, UK.
Shan Liu et al. "Joint Temporal-Spatial Bit Allocation for Video Coding With Dependency", Jan. 2005, vol. 15 No. 1, IEEE Transactions on Circuits and Systems for Video Technology.
Benjamin Bross et al. "Versatile Video Coding (Draft 2)" , Jul. 10-18, 2018, ISO/IEC JTC1/SC29/WG11 JVET-K1001.
Rajan Joshi et al. "High Efficiency Video Coding (HEVC) Screen Content Coding: Draft 4", Jun. 19-26, 2015 , ISO/IEC JTC1/SC29/WG11 JCTVC-U1005. Part 1.
Rajan Joshi et al. "High Efficiency Video Coding (HEVC) Screen Content Coding: Draft 4", Jun. 19-26, 2015 , ISO/IEC JTC1/SC29/WG11 JCTVC-U1005. Part 2.
Rajan Joshi et al. "High Efficiency Video Coding (HEVC) Screen Content Coding: Draft 4", Jun. 19-26, 2015 , ISO/IEC JTC1/SC29/WG11 JCTVC-U1005. Part 3.
Xiaozhong Xu et al. "Intra block copy in Versatile Video Coding with Reference Sample Memory Reuse" ,2019 Picture Coding Symposium (PCS).
Rajan Joshi et al. "Screen content coding test model 1 (SCM 1)" , JCTVC-Q1014, Valencia, Spain.
Xiaozhong Xu et al. "Block vector prediction for intra block copying in HEVC screen content coding", p. 273-282, 2015 Data Compression Conference.
Chun-Chi Chen et al. "Screen Content Coding Using Non-Square Intra Block Copy for HEVC", Jul. 2014, 2014 IEEE International Conference on Multimedia and Expo (ICME), Chengdu, China.
Yingbin Wang et al. "Intra Block Copy in AVS3 Video Coding Standard", Jul. 2020, 2020 IEEE International Conference on Multimedia & Expo Workshops (ICMEW), London, UK.
The European Patent Office (EPO) The Extended European Search Report for 21857572.8 Dec. 11, 2023 9 Pages.
Egilmez (Qualcomm) H E et al.: "Non-CE6: A Simplification of Implicit MTS", 126. MPEG Meeting; 2019035-Mar. 29, 2019; Geneva; (Motion Picture Expert Group or ISO/IEC JTC1/SC29/WVG11), No. m47081, Mar. 18, 2019 (Mar. 18, 2019), XP030210603, Retrieved from the Internet: URL: http://phenix.int-evry.fr/mpeq/doc_end_user/documents/126_Geneva/wg11/m47081-JVET-N0419-v2_JVET-N0419_v2.zip, JVET-N0419.docx.

\* cited by examiner (a) (b) (c) (d)

(a) (b) (c) (d)

(a) (b) (c) (d)

VIDEO DECODING METHOD AND APPARATUS, COMPUTERREADABLE MEDIUM, AND ELECTRONIC DEVICE

CROSS-REFERENCES TO RELATED APPLICATIONS

This application is a continuation application of PCT Patent Application No. PCT/CN2021/112355, entitled "VIDEO DECODING METHOD AND APPARATUS, COMPUTER READABLE MEDIUM, AND ELECTRONIC DEVICE" and filed on Aug. 12, 2021, which claims priority to Chinese Patent Application No. 202010855608.8, entitled "VIDEO DECODING METHOD AND APPARATUS, COMPUTER-READABLE MEDIUM, AND ELECTRONIC DEVICE" filed on Aug. 21, 2020, the entire contents of both of which are incorporated herein by reference.

FIELD OF THE TECHNOLOGY

The present disclosure relates to the fields of computer and communication technologies, and specifically, to a video decoding method and apparatus, a computer-readable medium, and an electronic device.

BACKGROUND OF THE DISCLOSURE

In a video encoding process, an encoder side usually needs to perform transform, quantization, and entropy encoding process on residual data between original video data and predicted video data, and then send the residual data to a decoder side.

Due to the diversity of residual data, a single discrete cosine transform (DCT) transform kernel cannot adapt to all residual characteristics. Therefore, for one residual block, it may need to select a plurality of DCT transform kernels as a transform matrix combination.

In this case, although the adaptability of the transform matrix combination to the residual block is improved, because an index of a transform kernel needs to be encoded for each coding unit (CU), the encoding efficiency is relatively low.

SUMMARY

Embodiments of the present disclosure provide a video decoding method and apparatus, a computer-readable medium, and an electronic device, to effectively improve the video encoding efficiency to some extent.

Other features and advantages of the present disclosure become obvious through the following detailed descriptions, or may be partially learned through the practice of the present disclosure.

According to an aspect of the embodiments of the present disclosure, a video decoding method is provided, including: performing entropy decoding processing on a code block of a video image frame of a video image frame sequence, to obtain a quantization coefficient block of residual data corresponding to the code block; collecting statistics of quantization coefficients in a target region in the quantization coefficient block, to obtain a quantization coefficient statistical value; selecting a transform matrix combination corresponding to the quantization coefficient statistical value; and performing inverse transform processing on an inverse quantization result of the quantization coefficient block based on the selected transform matrix combination, to obtain reconstructed residual data, the reconstructed residual data being used for video image reconstruction.

According to an aspect of the embodiments of the present disclosure, a video decoding apparatus is provided, including: a decoding unit, configured to perform entropy decoding processing on a code block of a video image frame of a video image frame sequence, to obtain a quantization coefficient block of residual data corresponding to the code block; a statistics collecting unit, configured to collect statistics of quantization coefficients in a target region in the quantization coefficient block, to obtain a quantization coefficient statistical value; a selection unit, configured to select a transform matrix combination corresponding to the quantization coefficient statistical value; and a processing unit, configured to perform inverse transform processing on an inverse quantization result of the quantization coefficient block based on the selected transform matrix combination, to obtain reconstructed residual data, the reconstructed residual data being used for video image reconstruction.

According to an aspect of the embodiments of the present disclosure, a non-transitory computer-readable medium is provided, storing a computer program, the computer program, when executed by a processor, implementing the video decoding method described in the foregoing embodiments.

According to an aspect of the embodiments of the present disclosure, an electronic device is provided, including: one or more processors; and a storage apparatus, configured to store one or more programs, the one or more programs, when executed by the one or more processors, causing the one or more processors to implement the video decoding method described in the foregoing embodiments.

According to an aspect of the embodiments of the present disclosure, a computer program product or a computer program is provided. The computer program product or the computer program includes computer instructions, and the computer instructions are stored in a computer-readable storage medium. A processor of a computer device reads the computer instructions from the computer-readable storage medium. The processor executes the computer instructions, to cause the computer device to perform the video decoding method provided in the foregoing various example embodiments.

In the technical solutions provided by some embodiments of the present disclosure, a quantization coefficient statistical value is obtained by collecting statistics of quantization coefficients in a target region in a quantization coefficient block, then a transform matrix combination corresponding to the quantization coefficient statistical value is selected, and inverse transform processing is performed on an inverse quantization result of the quantization coefficient block based on the selected transform matrix combination, so that the transform matrix combination corresponding to the code block can be implicitly indicated by using the quantization coefficients in the quantization coefficient block without requiring an encoder side to encode a transform matrix index for each coding unit, which reduces bits occupied by the transform matrix index, thereby effectively improving the video encoding efficiency.

It is to be understood that the foregoing general descriptions and the following detailed descriptions are merely for illustration and explanation purposes and are not intended to limit the present disclosure.

DESCRIPTION OF EMBODIMENTS

Figure 1:
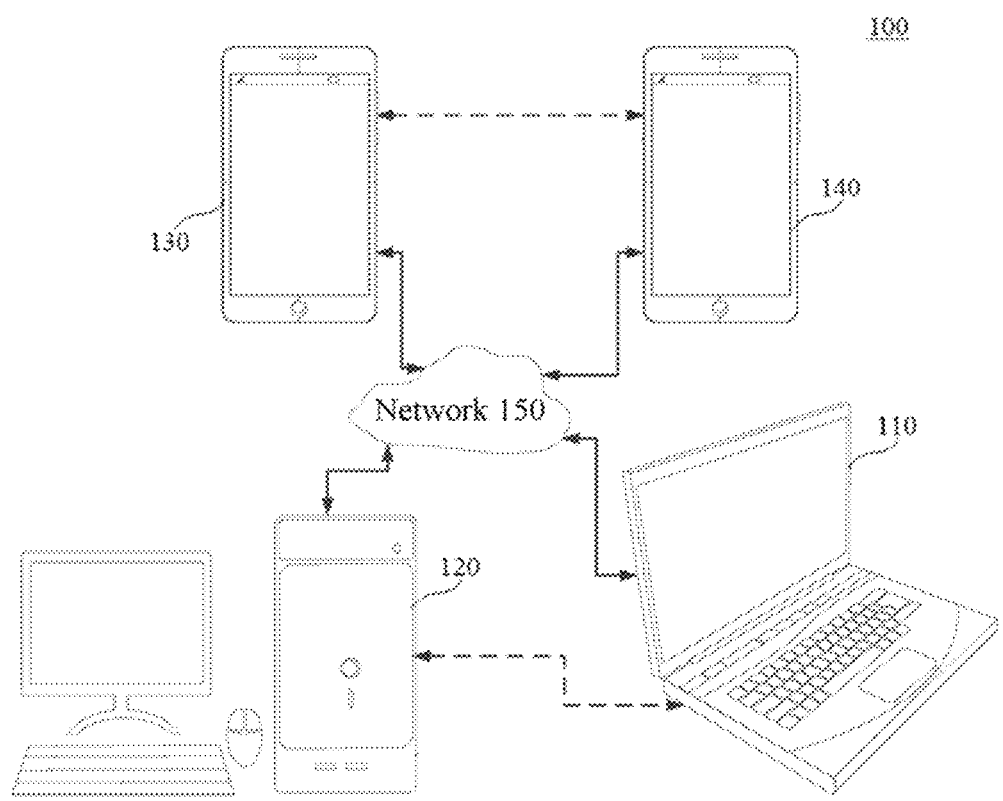
FIG. 1 is a schematic diagram of an exemplary system architecture according to a technical solution to which an embodiment of the present disclosure is applicable.

FIG. 1 is a schematic diagram of an exemplary system architecture according to a technical solution to which an embodiment of the present disclosure is applicable.

As shown in FIG. 1, a system architecture 100 includes a plurality of terminal apparatuses. The terminal apparatuses may communicate with each other through, for example, a network 150. For example, the system architecture 100 may include a first terminal apparatus 110 and a second terminal apparatus 120 interconnected to each other through the network 150. In the embodiment of FIG. 1, the first terminal apparatus 110 and the second terminal apparatus 120 perform unidirectional data transmission.

For example, the first terminal apparatus 110 may encode video data (for example, a video frame stream acquired by the terminal apparatus 110) for transmission to the second terminal apparatus 120 through the network 150. Transmission of the encoded video data is performed in the form of one or more encoded video bitstreams. The second terminal apparatus 120 can receive the encoded video data from the network 150, decode the encoded video data to recover the video data, and display a video screen according to the recovered video data.

In an embodiment of the present disclosure, the system architecture 100 may include a third terminal apparatus 130 and a fourth terminal apparatus 140 that perform bidirectional transmission of encoded video data. For example, the bidirectional transmission may occur during a video conference. For the bidirectional transmission, each terminal apparatus in the third terminal apparatus 130 and the fourth terminal apparatus 140 may encode video data (for example, a video screen stream acquired by the terminal apparatus), to transmit the encoded video data to the other terminal apparatus in the third terminal apparatus 130 and the fourth terminal apparatus 140 through the network 150. Each terminal apparatus in the third terminal apparatus 130 and the fourth terminal apparatus 140 may receive encoded video data transmitted by the other terminal apparatus in the third terminal apparatus 130 and the fourth terminal apparatus 140, and may decode the encoded video data to recover video data, and display a video screen on an accessible display apparatus according to the recovered video data.

In the embodiment of FIG. 1, the first terminal apparatus 110, the second terminal apparatus 120, the third terminal apparatus 130, and the fourth terminal apparatus 140 each may be a server, a personal computer, or a smart phone, but the principle disclosed in the present disclosure is not limited thereto. The embodiments disclosed in the present disclosure are applicable to a laptop computer, a tablet computer, a media player, and/or a dedicated video conference device. The network 150 represents any quantity of networks that transmit encoded video data between the first terminal apparatus 110, the second terminal apparatus 120, the third terminal apparatus 130, and the fourth terminal apparatus 140, and includes, for example, a wired network and/or a wireless communication network. The communication network 150 can exchange data in a circuit-switched channel and/or a packet-switched channel. The network may include a telecommunications network, a local area network, a wide area network, and/or the Internet. For the objective of the present disclosure, unless explained below, the architecture and topology of the network 150 may be irrelevant to the operations disclosed in the present disclosure.

Figure 2:
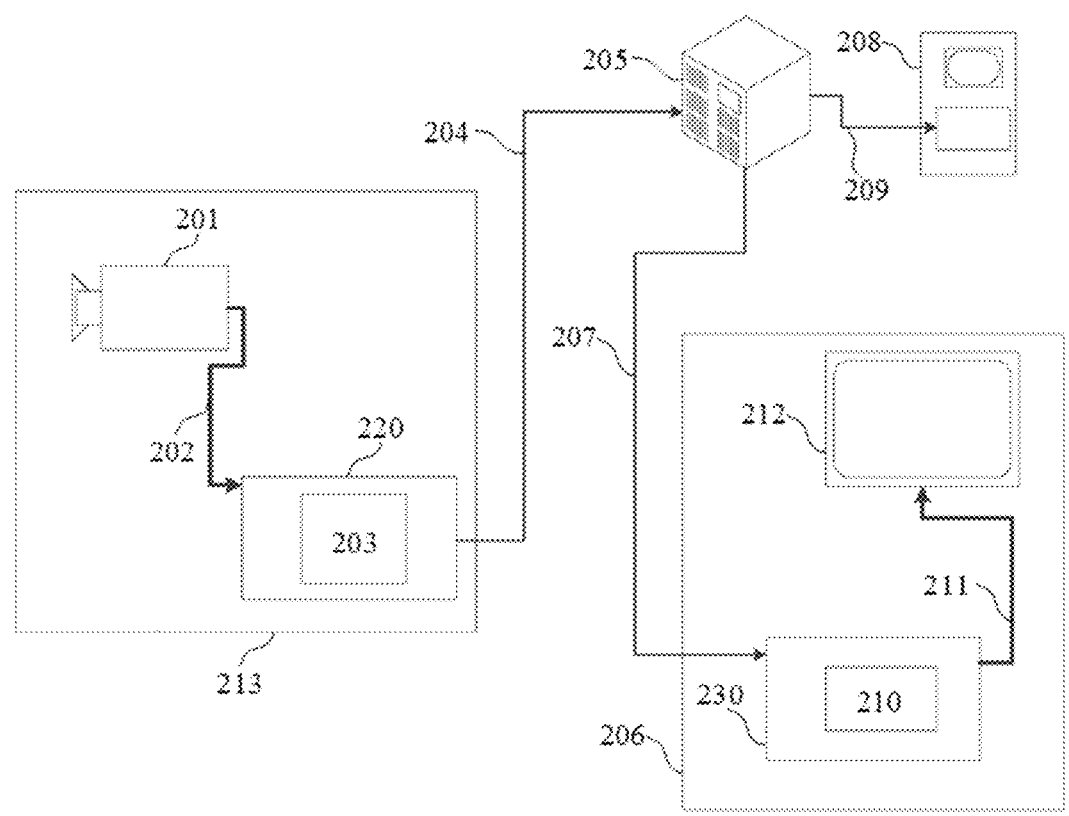
FIG. 2 is a schematic diagram of a manner of placing a video encoding apparatus and a video decoding apparatus in a streaming system.

In an embodiment of the present disclosure, FIG. 2 shows a manner of placing a video encoding apparatus and a video decoding apparatus in a streaming system. The subject matter disclosed in the present disclosure is equally applicable to other applications supporting videos, including, for example, video conferencing, a digital television (TV), and storing a compressed video on a digital medium, including a CD, a DVD, a memory stick, and the like.

The streaming system may include an acquisition sub-system 213. The acquisition sub-system 213 may include a video source 201 such as a digital camera. The video source creates an uncompressed video screen stream 202. In this embodiment, the video screen stream 202 includes a sample captured by a digital camera. Compared with encoded video data 204 (or an encoded video bitstream 204), the video screen stream 202 is depicted as a video screen stream with a high data volume emphasized by a thick line. The video screen stream 202 may be processed by an electronic device 220. The electronic device 220 includes a video encoding apparatus 203 coupled to the video source 201. The video encoding apparatus 203 may include hardware, software, or a combination of software and hardware to implement or carry out the aspects of the disclosed subject matter described below in more detail. Compared with the video screen stream 202, the encoded video data 204 (or encoded video bitstream 204) is depicted as encoded video data 204 (or an encoded video bitstream 204) with a relatively low data volume emphasized by a thin line, and can be stored in a streaming server 205 for future use. One or more streaming client sub-systems, for example, a client sub-system 206 and a client sub-system 208 in FIG. 2, can access the streaming server 205 to retrieve a duplicate 207 and a duplicate 209 of the encoded video data 204. The client sub-system 206 may include, for example, a video decoding apparatus 210 in an electronic device 230. The video decoding apparatus 210 decodes the incoming duplicate 207 of the encoded video data and generates an output video screen stream 211 that can be rendered on a display 212 (for example, a display screen) or another rendering apparatus. In some streaming systems, the encode video data 204, the video data 207, and the video data 209 (for example, video bitstreams) may be encoded according to some video encoding/compression standards. The standards, for example, include ITU-T H.265. In this embodiment, the video encoding standard under development is informally referred to as next-generation video coding (Versatile Video Coding (VVC)). The present disclosure can be used in the context of the VVC standard.

The electronic device 220 and the electronic device 230 may include other components not shown in the figure. For example, the electronic device 220 may include a video decoding apparatus, and the electronic device 230 may further include a video encoding apparatus.

In an embodiment of the present disclosure, using the international video coding standards High Efficiency Video Coding (HEVC) and Versatile Video Coding (VVC) and the China national video coding standard Audio Video Coding Standard (AVS) as an example, after a video frame image is inputted, the video frame image is divided into a plurality of non-overlapping processing units according to a block size. Each processing unit may perform a similar compression operation. The processing unit may be referred to as a coding tree unit (CTU) or a largest coding unit (LCU). Finer division can be further performed on the CTU, to obtain one or more basic coding units (CUs). The CU is the most basic element in a coding process. Some concepts involved in encoding the CU are described below:

Predictive coding: The predictive coding includes modes such as intra prediction and inter prediction. After an original video signal is predicted by using a selected reconstructed video signal, a residual video signal is obtained. The encoder side needs to determine which predictive coding mode to select for the current CU, and inform the decoder side. Intra prediction: A predicted signal comes from a region in a same image that has been encoded and reconstructed. Inter prediction means that a predicted signal comes from another image (referred to as a reference image) that has been encoded and that is different from a current image.

Transform & Quantization: A residual video signal is transformed into a transform domain through a transform operation such as discrete fourier transform (DFT) or discrete cosine transform (DCT), and is referred to as a transform coefficient. A lossy quantization operation is performed on the transform coefficient, to lose some information, so that the quantized signal is beneficial to a compressed expression. In some video encoding standards, there may be more than one transform mode to select from. Therefore, the encoder side also needs to select one of the more than one transform mode for a current CU, and inform the decoder side. The fineness of quantization usually depends on a quantization parameter (QP). A larger value of the QP represents that coefficients within a larger range will be quantized as a same output, and therefore, may usually bring a larger distortion and a lower bit rate. Conversely, a smaller value of the QP represents that coefficients within a smaller range will be quantized as a same output, and therefore, may usually bring a smaller distortion while corresponding to a higher bit rate.

Entropy coding or statistical coding: Statistical compression coding is performed quantized transform domain signals according to frequencies of occurrence of values, and finally, a binarized (0 or 1) compressed bitstream is outputted. In addition, entropy coding also needs to be performed other information, such as a selected encoding mode and a motion vector, generated through encoding, to reduce a bit rate. Statistical coding is a lossless coding mode that can effectively reduce a bit rate required for expressing a same signal. Common statistical coding modes include Variable Length Coding (VLC) or Content Adaptive Binary Arithmetic Coding (CABAC).

Loop filtering: Operations of inverse quantization, inverse transform, and prediction compensation are performed on a signal that has been encoded, to obtain a reconstructed image. Compared with an original image, the reconstructed image has some information different from that of the original image due to impact of quantization. That is, the reconstructed image may generate a distortion. Therefore, a filtering operation may be performed on the reconstructed image. For example, a filter, such as a deblocking filter (DB), a sample adaptive offset (SAO) filter, or an adaptive loop filter (ALF), can effectively reduce a degree of distortion generated by quantization. Because the filtered reconstructed image is used as a reference for subsequently encoding an image and is used for predicting a future image signal, the foregoing filtering operation is also referred to as loop filtering, that is, a filtering operation in an encoding loop.

Figure 3:
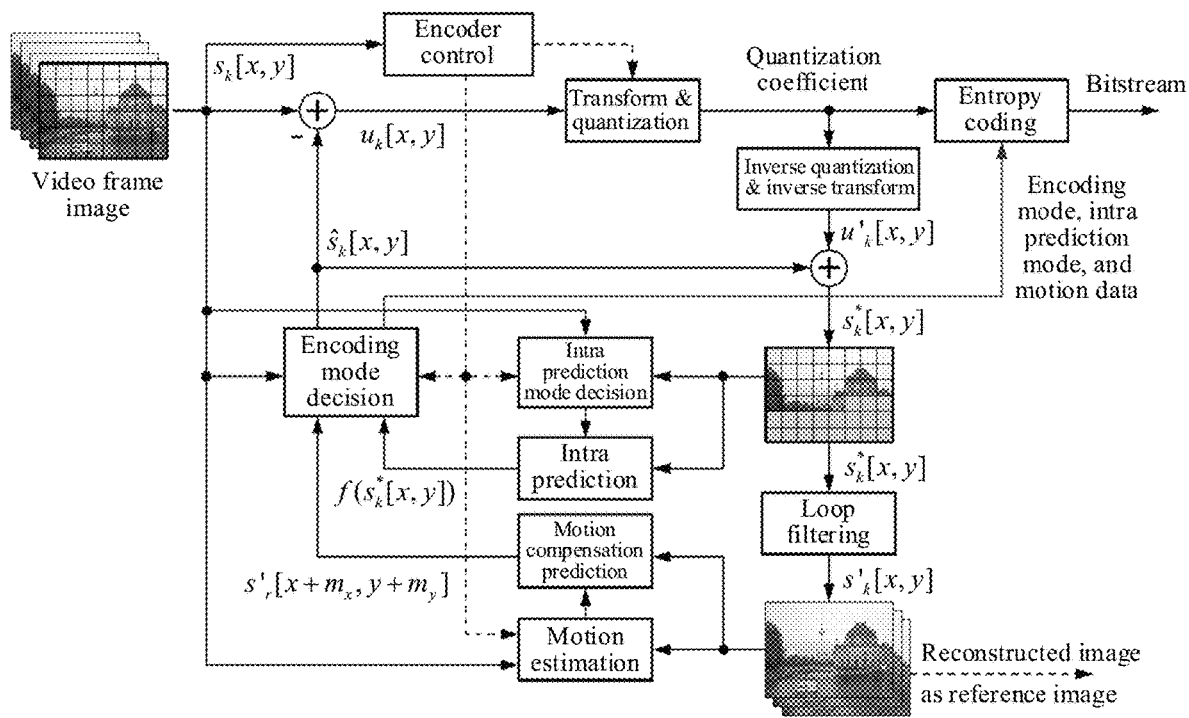
FIG. 3 is a basic flowchart of a video encoding process.

In an embodiment of the present disclosure, FIG. 3 is a basic flowchart of a video encoding process. In this procedure, descriptions are provided by using intra prediction as an example. A different operation is performed on an original image signal $s_k[x,y]$ and a predicted image signal $\hat{s}_k[x,y]$, to obtain a residual signal $u_k[x,y]$. After the residual signal $u_k[x,y]$ is transformed and quantized, a quantization coefficient is obtained. On the one hand, an encoded bitstream is obtained through entropy coding on the quantization coefficient, and on the other hand, a reconstructed residual signal $u'_k[x,y]$ is obtained through quantization and inverse transform processing on the quantization coefficient. The predicted image signal $s_k[x,y]$ and the reconstructed residual signal $u'_k[x,y]$ are superimposed to generate an image signal $s_k^*[x,y]$. On the one hand, the image signal $s_k^*[x,y]$ is inputted to an intra mode decision module and an intra prediction module intra prediction processing, and on the other hand, a reconstructed image signal $s'_k[x,y]$ is outputted through loop filtering. The reconstructed image signal $s'_k[x,y]$ may be used as a reference image of a next frame for motion estimation and motion compensation prediction. Then, a predicted image signal $\hat{s}_k[x,y]$ of the next frame is obtained based on a result $s'_r[x+m_x, y+m_y]$ of the motion compensation prediction and an intra prediction result $f(s_k^*[x,y])$, and the foregoing procedure is continuously repeated until the encoding is completed.

Figure 4:
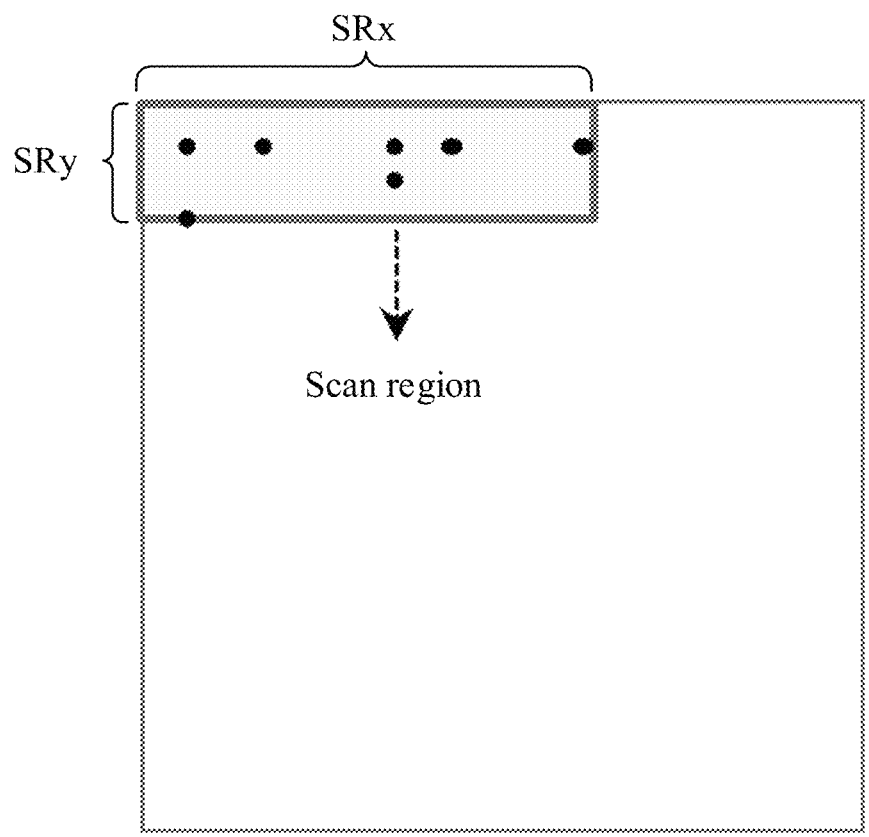
FIG. 4 shows a scan region marked by using a scan region coefficient coding (SRCC) technology.
Figures 5, 6:
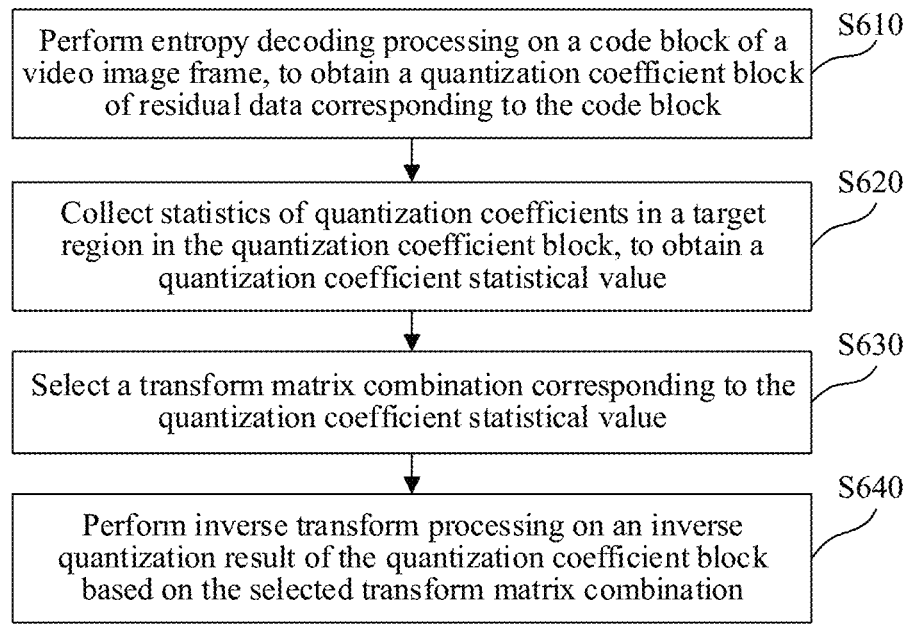
FIG. 5 is a schematic diagram of a sequence of scanning a marked scan region.
FIG. 6 is a flowchart of a video decoding method according to an embodiment of the present disclosure.

In addition, because non-zero coefficients of residual signals in a quantization coefficient block that has been transformed and quantized have a relatively high probability of concentrating in the left and upper regions of the block, while coefficients in the right and lower regions of the block are usually 0, an SRCC technology is introduced. A size SRx×SRy of an upper left region of the non-zero coefficients included in each quantization coefficient block (of which a size is W×H) can be marked by using the SRCC technology. SRx is a horizontal coordinate of the rightmost non-zero coefficient in the quantization coefficient block, and SRy is a vertical coordinate of the lowermost non-zero coefficient in the quantization coefficient block. In addition, $1 \leq SRx \leq W$, $1 \leq SRy \leq H$, and coefficients outside the region are all 0. In the SRCC technology, (SRx, SRy) are used to determine a quantization coefficient region that needs to be scanned in a quantization coefficient block. As shown in FIG. 4, only quantization coefficients within the scan region marked by (SRx, SRy) needs to be encoded. A scanning order of the encoding is shown in FIG. 5, may be reverse zigzag scanning from the lower right corner to the upper left corner.

Based on the above encoding process, for each CU on the decoder side, after a compressed bitstream (that is, a bitstream) is obtained, entropy decoding is performed to obtain various mode information and quantization coefficients. Then, inverse quantization and inverse transform are performed on the quantization coefficients, to obtain a residual signal. On the other hand, a predicted signal corresponding to the CU may be obtained according to the known encoding mode information, and a reconstructed signal can be obtained by adding the residual signal and the predicted signal. Operations, such as loop filtering, may be further performed on the reconstructed signal, to generate a final output signal.

In the foregoing encoding and decoding procedures, the residual signal is transformed to concentrate energy of the residual signal in less low-frequency coefficients, that is, most coefficient values are small. Then, after passing a subsequent quantization module, smaller coefficient values become zero values, which greatly reduces the costs of encoding the residual signal. However, due to the diversity of residual distribution, a single DCT transform cannot adapt to all residual characteristics. Therefore, transform kernels, such as DST7 and DCT8, are introduced into the transform processing process, and a horizontal transform and a vertical transform can be performed on the residual signal by using different transform kernels. Using the adaptive multiple core transform (AMT) technology as an example, the following transform combinations may be selected for transforming a residual signal: (DCT2, DCT2), (DCT8, DCT8), (DCT8, DST7), (DST7, DCT8), and (DST7, DST7).

Which transform combination is specifically selected for the residual signal needs to be decided on the encoder side by using rate—distortion optimization (RDO). Although the adaptability of the transform matrix combination to the residual block is improved, because an index of a transform kernel needs to be encoded for each coding unit, the encoding efficiency is relatively low.

To resolve the foregoing problems, the embodiments of the present disclosure provide implicitly indicating a transform matrix combination corresponding to a code block by using quantization coefficients in a quantization coefficient block, which can further reduce bits occupied by a transform matrix index, effectively improving the video encoding efficiency.

Implementation details of the technical solutions of the embodiments of the present disclosure are specifically described below.

FIG. 6 is a flowchart of a video decoding method according to an embodiment of the present disclosure. The video decoding method may be executed by a device with computing and processing functions, for example, may be executed by a terminal device or a server. Referring to FIG. 6, the video decoding method includes at least step S610 to step S640, which are described below in detail:

Step S610: Perform entropy decoding processing on a code block of a video image frame, to obtain a quantization coefficient block of residual data corresponding to the code block. For example, the terminal device and/or the server may receive encoded video bitstream data. The video bitstream data may include data of a video image frame sequence. The video image frame sequence includes the video image frame being currently processed in step S610. The terminal device and/or the server may be configured to perform a decoding process on the video bitstream. The entropy decoding is included in the decoding process.

In an embodiment of the present disclosure, a video image frame sequence includes a plurality of video image frames in series. Each video image frame can be further divided into slices, and a slice can be further divided into a series of LCUs (or CTUs). The LCU includes a plurality of CUs. The video image frame is encoded by using a block as a unit. In some new video encoding standards. For example, in the H.264 standard, there are macroblocks (MBs). The macroblock can be further divided into a plurality of prediction blocks used for predictive coding. In the HEVC standard, basic concepts, such as the coding unit (CU), the prediction unit (PU), and the transform unit (TU), are used to divide a variety of block units in terms of function, and adopt a novel tree-based structure for description. For example, the CU can be divided into smaller CUs according to the quadtree, and the smaller CU can be further divided, to form a quadtree structure. The code block in this embodiment of the present disclosure may be a CU, or a block smaller than the CU, for example, a smaller block obtained by dividing the CU.

Step S620: Collect statistics of quantization coefficients in a target region in the quantization coefficient block, to obtain a quantization coefficient statistical value.

In one embodiment, before statistics of quantization coefficients of the quantization coefficient block are collected, the decoder side first needs to determine whether to use quantization coefficients to implicitly indicate the transform matrix combination of the code block. When the quantization coefficients are used, statistics of quantization coefficients in a target region in the quantization coefficient block are collected.

With regard to whether to adopt the manner of implicitly indicating a transform matrix combination by quantization coefficients, in one embodiment, the encoder side can inform, by setting an index identifier in a header of encoded data, the decoder side of using the quantization coefficients to implicitly indicate the transform matrix combination of the code block. Correspondingly, the decoder side determines, by detecting the index identifier in the header of the encoded data, whether statistics of quantization parameters need to be collected.

The header may be a sequence header of encoded data corresponding to a video image sequence, an image header of encoded data corresponding to a video image frame, a slice header of encoded data corresponding to a slice in the video image frame, or an LCU header of encoded data corresponding to an LCU in the video image frame, which is not limited in this embodiment.

In an embodiment of the present disclosure, the encoder side may indicate, by setting a specified index identifier in a sequence header of first encoded data corresponding to a video image frame sequence, that the transform matrix combination needs to be selected for code blocks in the first encoded data according to the quantization coefficients in the quantization coefficient block. Using the technical solution of this embodiment, an index identifier is set in a sequence header of first encoded data to indicate all code blocks corresponding to the entire video image frame sequence, which can effectively reduce bits occupied by the index identifier, thereby improving the video encoding efficiency.

In an embodiment of the present disclosure, the encoder side may indicate, by setting a specified index identifier in an image header of second encoded data corresponding to a video image frame, that the transform matrix combination needs to be selected for code blocks in the second encoded data according to the quantization coefficients in the quantization coefficient block. Using the technical solution of this embodiment, an index identifier is set in an image header of second encoded data to indicate all code blocks corresponding to the entire video image frame, which also can effectively reduce bits occupied by the index identifier, thereby improving the video encoding efficiency.

In an embodiment of the present disclosure, the encoder side may indicate, by setting a specified index identifier in a slice header of third encoded data corresponding to a slice in the video image frame, that the transform matrix combination needs to be selected for code blocks in the third encoded data according to the quantization coefficients in the quantization coefficient block. Using the technical solution of this embodiment, an index identifier is set in a slice header of third encoded data to indicate all code blocks corresponding to the entire slice, which also can effectively reduce bits occupied by the index identifier, thereby improving the video encoding efficiency.

In an embodiment of the present disclosure, the encoder side may indicate, by setting a specified index identifier in an LCU header of fourth encoded data corresponding to an LCU in the video image frame, that the transform matrix combination needs to be selected for code blocks in the fourth encoded data according to the quantization coefficients in the quantization coefficient block. Using the technical solution of this embodiment, an index identifier is set in an LCU header of fourth encoded data to indicate all code blocks corresponding to the entire LCU, which also can effectively reduce bits occupied by the index identifier, thereby improving the video encoding efficiency.

In addition to using an index identifier to display an indication, in an embodiment of the present disclosure, the decoder side may determine, according to a relationship between a size of the code block and a threshold, whether the transform matrix combination needs to be selected for the code blocks according to the quantization coefficients in the quantization coefficient block.

For example, when the size of the code block is relatively small (for example, less than the threshold), the decoder side may determine that the transform matrix combination needs to be selected for the code blocks according to the quantization coefficients in the quantization coefficient block. Conversely, when the size of the code block is relatively large (for example, greater than the threshold), the decoder side may determine that the transform matrix combination does not need to be selected for the code blocks according to the quantization coefficients in the quantization coefficient block. In the technical solution of this embodiment, the size of the code block can be used to implicitly indicate whether the transform matrix combination needs to be selected according to the quantization coefficient in the quantization coefficient block without using an additional bit, so that the video encoding efficiency can also be improved.

In another embodiment, the encoder side may set an index identifier with different values in a header of encoded data, so as to determine, based on value combinations of the index identifier in the header of the encoded data at different levels (for example, a frame sequence level, a frame level, a slice level, and an LCU level), whether the transform matrix combination needs to be selected for the code blocks at a corresponding level according to the quantization coefficients in the quantization coefficient block.

In an embodiment of the present disclosure, when an index identifier included in a sequence header of first encoded data corresponding to a video image frame sequence is a first value (which, for example, may be 0), the encoder side determines that the transform matrix combination does not need to be selected for code blocks in the first encoded data according to the quantization coefficients in the quantization coefficient block. When the index identifier included in the sequence header is a second value (which, for example, may be 1), a decision may be further made according to an index identifier included in an image header of second encoded data corresponding to a video image frame.

In an embodiment of the present disclosure, when the index identifier included in the sequence header is the second value (which, for example, may be 1), and the index identifier included in the image header is the first value (which, for example, may be 0), the encoder side may determine that the transform matrix combination does not need to be selected for code blocks in the second encoded data according to the quantization coefficients in the quantization coefficient block. When the index identifier included in the sequence header and the index identifier included in the image header are both the second value (which, for example, may be 1), the encoder side may determine that the transform matrix combination needs to be selected for code blocks in the second encoded data according to the quantization coefficients in the quantization coefficient block. In some embodiments, in this case, the decision may not be made by using the slice header, the LCU header, and the size of the code block any more.

Certainly, in an embodiment of the present disclosure, when the index identifier included in the sequence header and the index identifier included in the image header are both the second value (which, for example, may be 1), a decision may be further made according to an index identifier included in a slice header of third encoded data corresponding to a slice of the video image frame. For example, when the index identifier included in the sequence header and the index identifier included in the image header are both the second value, but an index identifier included in slice header information of third encoded data corresponding to a slice is the first value (which, for example, may be 0), the encoder side may determine that the transform matrix combination does not need to be selected for code blocks in the third encoded data according to the quantization coefficients in the quantization coefficient block. When the index identifier included in the sequence header, the index identifier included in the image header, and the index identifier included in the slice header are all the second value (which, for example, may be 1), the encoder side may determine that the transform matrix combination needs to be selected for all code blocks in the third encoded data according to the quantization coefficients in the quantization coefficient block. In some embodiments, in this case, the decision may not be made by using the LCU header and the size of the code block any more.

Certainly, in an embodiment of the present disclosure, when the index identifier included in the sequence header, the index identifier included in the image header, and the index identifier included in the slice header are all the second value (which, for example, may be 1), a decision may be further made according to an index identifier included in an LCU header of fourth encoded data corresponding to an LCU in the slice. For example, when the index identifier included in the sequence header, the index identifier included in the image header, and the index identifier included in the slice header are all the second value, but an index identifier included in LCU header information of fourth encoded data corresponding to an LCU is the first value (which, for example, may be 0), the encoder side may determine that the transform matrix combination does not need to be selected for code blocks in the fourth encoded data according to the quantization coefficients in the quantization coefficient block. When the index identifier included in the sequence header, the index identifier included in the image header, the index identifier included in the slice header, and the index identifier included in the LCU header information are all the second value (which, for example, may be 1), the encoder side may determine that the transform matrix combination needs to be selected for all code blocks in the fourth encoded data according to the quantization coefficients in the quantization coefficient block. In some embodiments, in this case, the decision may not be made by using the size of the code block any more.

Certainly, in an embodiment of the present disclosure, when the index identifier included in the sequence header, the index identifier included in the image header, the index identifier included in the slice header, and the index identifier included in the LCU header information are all the second value (which, for example, may be 1), a decision may be further made according to a size of the code block. For example, when the index identifier included in the sequence header, the index identifier included in the image header, the index identifier included in the slice header, and the index identifier included in the LCU header information are all the second value, but a size of a code block is relatively small (for example, is less than a threshold), the encoder side may determine that the corresponding transform matrix combination needs to be selected for the code block according to the quantization coefficients in the quantization coefficient block. Conversely, when the size of the code block is relatively large (for example, greater than the threshold), the decoder side may determine that the transform matrix combination needs to be selected for the code block according to the quantization coefficients in the quantization coefficient block.

In conclusion, the determining that the transform matrix combination corresponding to the code block needs to be selected according to the quantization coefficients in the quantization coefficient block includes the following manners:

1. Only the index identifier in the sequence header is used for indication, and the decision is not made by using the image header, the slice header, the LCU header, and the size of the code block any more. In this case, when the index identifier included in the sequence header is 1 (the numerical value is only used for illustration), it indicates that the transform matrix combination needs to be selected for code blocks in the first encoded data corresponding to the video image frame sequence according to the quantization coefficients in the quantization coefficient block.
2. Only the index identifier in the image header is used for indication, and the decision is not made by using the sequence header, the slice header, the LCU header, and the size of the code block any more. In this case, when the index identifier included in the image header is 1 (the numerical value is only used for illustration), it indicates that the transform matrix combination needs to be selected for code blocks in the second encoded data corresponding to the video image frame according to the quantization coefficients in the quantization coefficient block.
3. Only the index identifier in the slice header is used for indication, and the decision is not made by using the sequence header, the image header, the LCU header, and the size of the code block any more. In this case, when the index identifier in the slice header is 1 (the numerical value is only used for illustration), it indicates that the transform matrix combination needs to be selected for code blocks in the third encoded data corresponding to the slice according to the quantization coefficients in the quantization coefficient block.
4. Only the index identifier in the LCU header is used for indication, and the decision is not made by using the sequence header, the image header, the slice header, and the size of the code block any more. In this case, when the index identifier in the LCU header is 1 (the numerical value is only used for illustration), it indicates that the transform matrix combination needs to be selected for code blocks in the fourth encoded data corresponding to the LCU according to the quantization coefficients in the quantization coefficient block.
5. Only the size of the code block is used for implicit indication, and the decision is not made by using the sequence header, the image header, the slice header, and the LCU header any more. In this case, when the size of the code block is relatively small (for example, less than the threshold), it can be determined that the transform matrix combination needs to be selected for the code blocks according to the quantization coefficients in the quantization coefficient block. Conversely, when the size of the code block is relatively large (for example, greater than the threshold), it can be determined that the corresponding transform matrix combination does not need to be selected for the code blocks according to the quantization coefficients in the quantization coefficient block obtained through entropy decoding.
6. Only the index identifier in the sequence header and the index identifier in the image header are used for indication, and the decision is not made by using the slice header, the LCU header, and the size of the code block any more. In this case, when the index identifier in the sequence header and the index identifier included in the image header are both 1 (the numerical value is only used for illustration), it indicates that the transform matrix combination needs to be selected for code blocks in the second encoded data corresponding to the video image frame according to the quantization coefficients in the quantization coefficient block. When the index identifier in the sequence header is 1, but the index identifier included in the image header is 0 (the numerical value is only used for illustration), it indicates that the transform matrix combination does not need to be selected for code blocks in the second encoded data corresponding to the video image frame according to the quantization coefficients in the quantization coefficient block.
7. The index identifier in the sequence header, the index identifier in the image header, and the index identifier in the slice header are used for indication, and the decision is not made by using the LCU header and the size of the code block any more. In this case, when the index identifier in the sequence header, the index identifier included in the image header, and the index identifier in the slice header are all 1 (the numerical value is only used for illustration), it indicates that the transform matrix combination needs to be selected for code blocks in the third encoded data corresponding to the slice according to the quantization coefficients in the quantization coefficient block. When the index identifier in the sequence header and the index identifier in the image header are 1, but the index identifier included in the slice header is 0 (the numerical value is only used for illustration), it indicates that the transform matrix combination does not need to be selected for code blocks in the third encoded data corresponding to the slice according to the quantization coefficients in the quantization coefficient block.

8. The index identifier in the sequence header, the index identifier in the image header, the index identifier in the slice header, and the index identifier in the LCU header are used for indication, and the decision is not made by using the size of the code block any more. In this case, when the index identifier in the sequence header, the index identifier included in the image header, the index identifier in the slice header, and the index identifier in the LCU header are all 1 (the numerical value is only used for illustration), it indicates that the transform matrix combination needs to be selected for code blocks in the fourth encoded data corresponding to the LCU according to the quantization coefficients in the quantization coefficient block. When the index identifier in the sequence header, the index identifier in the image header, and the index identifier included in the slice header are 1, but the index identifier in the LCU header is 0 (the numerical value is only used for illustration), it indicates that the corresponding transform matrix combination does not need to be selected for code blocks in the fourth encoded data corresponding to the LCU according to the quantization coefficients in the quantization coefficient block.

9. The index identifier in the sequence header, the index identifier in the image header, the index identifier in the slice header, the index identifier in the LCU header, and the size of the code block are used for making a decision. In this case, when the index identifier in the sequence header, the index identifier included in the image header, the index identifier in the slice header, and the index identifier in the LCU header are all 1 (the numerical value is only used for illustration), and the size of the code block is smaller than a set threshold, it indicates that the transform matrix combination needs to be selected the code block according to the quantization coefficients in the quantization coefficient block. When the index identifier in the sequence header, the index identifier included in the image header, the index identifier in the slice header, and the index identifier in the LCU header are all 1, but the size of the code block is greater than the set threshold, it indicates that the transform matrix combination does not need to be selected the code block according to the quantization coefficients in the quantization coefficient block.

Certainly, there may be the following manners:

10. The index identifier in the image header and the index identifier in the slice header are used for indication, and the decision is not made by using the sequence header, the LCU header, and the size of the code block any more. In this case, when the index identifier included in the image header, and the index identifier in the slice header are all 1 (the numerical value is only used for illustration), it indicates that the transform matrix combination needs to be selected for all code blocks in the third encoded data corresponding to the slice according to the quantization coefficients in the quantization coefficient block. When the index identifier in the image header is 1, but the index identifier included in the slice header is 0 (the numerical value is only used for illustration), it indicates that the transform matrix combination does not need to be selected for the code blocks in the third encoded data corresponding to the slice according to the quantization coefficients in the quantization coefficient block.

11. The index identifier in the image header, the index identifier in the slice header, and the index identifier in the LCU header are used for indication, and the decision is not made by using the sequence header and the size of the code block any more. In this case, when the index identifier included in the image header, the index identifier in the slice header, and the index identifier in the LCU header are all 1 (the numerical value is only used for illustration), it indicates that the transform matrix combination needs to be selected for code blocks in the fourth encoded data corresponding to the LCU according to the quantization coefficients in the quantization coefficient block. When the index identifier in the image header, and the index identifier included in the slice header are 1, but the index identifier in the LCU header is 0 (the numerical value is only used for illustration), it indicates that the transform matrix combination does not need to be selected for code blocks in the fourth encoded data corresponding to the LCU according to the quantization coefficients in the quantization coefficient block.

12. The index identifier in the image header, the index identifier in the slice header, the index identifier in the LCU header, and the size of the code block are used for indication, and the decision is not made by using the sequence header any more. In this case, when the index identifier included in the image header, the index identifier in the slice header, and the index identifier in the LCU header are all 1 (the numerical value is only used for illustration), and the size of the code block is smaller than a set threshold, it indicates that the transform matrix combination needs to be selected the code block according to the quantization coefficients in the quantization coefficient block. When the index identifier included in the image header, the index identifier in the slice header, and the index identifier in the LCU header are all 1, but the size of the code block is greater than the set threshold, it indicates that the transform matrix combination does not need to be selected the code block according to the quantization coefficients in the quantization coefficient block.

In addition, in this embodiment of the present disclosure, there are more other indication manners, which are not described in detail.

In one embodiment, statistics of the quantization coefficients in the target region in the quantization coefficient block are collected, the decoder side may collect statistics of all quantization coefficients in the target region. In addition, during statistics collection, either original numerical values of the quantization coefficients or converted numerical values of the quantization coefficients can be used. Correspondingly, during encoding, the encoder side adjusts quantization parameters in the target region in the quantization coefficient block, to implicitly indicate the transform matrix combination without using an additional bit.

In an embodiment of the present disclosure, when collecting statistics of the quantization coefficients in the target region in the quantization coefficient block, the decoder side may collect the statistics of the quantization coefficients in the target region according to numerical values of the quantization coefficients in the target region in the quantization coefficient block, to obtain a statistical result, and then directly use the statistical result as a quantization coefficient statistical value. Alternatively, after obtaining the statistical result, the decoder side calculates a remainder of the statistical result against a set value, and uses the remainder as the quantization coefficient statistical value. The set value may be any non-zero number, for example, may be 2, 3, 4, or the like.

In an embodiment of the present disclosure, when the statistics of the quantization coefficients in the target region are collected according to the numerical values of the quantization coefficients in the target region in the quantization coefficient block, a sum of the numerical values of the quantization coefficients in the target region may be calculated, and the obtained sum is used as the statistical result. Alternatively, a sum of absolute values of the quantization coefficients in the target region may be calculated, and the obtained sum is used as the statistical result. Alternatively, first, numerical values of quantization coefficients of which the numerical values are odd numbers in the target region may be converted into a first numerical value, and numerical values of quantization coefficients of which the numerical values are even numbers are converted into a second numerical value, and then, a sum of numerical values of the quantization coefficients in the target region after the numerical value conversion is calculated, and the obtained sum is used as the statistical result, one of the first numerical value or the second numerical value being an odd number, and the other being an even number.

For example, the decoder side converts the numerical values of the quantization coefficients of which the numerical values are odd numbers in the target region into 1, and converts the numerical values of the quantization coefficients of which the numerical values are even numbers into 0. Alternatively, the decoder side converts the numerical values of the quantization coefficients of which the numerical values are odd numbers in the target region into 0, and converts the numerical values of the quantization coefficients of which the numerical values are even numbers into 1. Alternatively, the decoder side converts the numerical values of the quantization coefficients of which the numerical values are odd numbers in the target region into 3, and converts the numerical values of the quantization coefficients of which the numerical values are even numbers into 2. Alternatively, the decoder side converts the numerical values of the quantization coefficients of which the numerical values are odd numbers in the target region into 2, and converts the numerical values of the quantization coefficients of which the numerical values are even numbers into 3. Specific values of the first numerical value and the second numerical value are not limited in the embodiments of the present disclosure.

In another embodiment, statistics of the quantization coefficients in the target region in the quantization coefficient block are collected, the decoder side may collect statistics of some quantization coefficients (for example, odd-number quantization parameters or even-number quantization parameters) in the target region. In addition, during statistics collection, either original numerical values of the quantization coefficients or converted numerical values of the quantization coefficients can be used. Correspondingly, during encoding, the encoder side adjusts some quantization parameters in the target region in the quantization coefficient block, to implicitly indicate the transform matrix combination without using an additional bit.

In an embodiment of the present disclosure, when the statistics of the quantization coefficients in the target region are collected according to the numerical values of the quantization coefficients in the target region in the quantization coefficient block, a quantity of quantization coefficients of which numerical values are odd numbers in the target region may be used as the statistical result. Alternatively, a sum of numerical values of quantization coefficients of which the numerical values are odd numbers in the target region may be calculated, and the obtained sum is used as the statistical result. Alternatively, a sum of absolute values of quantization coefficients of which numerical values are odd numbers in the target region may be calculated, and the obtained sum is used as the statistical result. Alternatively, numerical values of quantization coefficients of which the numerical values are odd numbers in the target region may be converted into a first numerical value, and numerical values of quantization coefficients of which the numerical values are even numbers are converted into a second numerical value, and then, a sum of odd number values of the quantization coefficients in the target region after the numerical value conversion is calculated, and the obtained sum is used as the statistical result, one of the first numerical value or the second numerical value being an odd number, and the other being an even number.

In an embodiment of the present disclosure, when the statistics of the quantization coefficients in the target region are collected according to the numerical values of the quantization coefficients in the target region in the quantization coefficient block, a quantity of quantization coefficients of which numerical values are even numbers in the target region may be used as the statistical result. Alternatively, a sum of numerical values of quantization coefficients of which the numerical values are even numbers in the target region may be calculated, and the obtained sum is used as the statistical result. Alternatively, a sum of absolute values of quantization coefficients of which numerical values in the target region are even numbers may be calculated, and the obtained sum is used as the statistical result. Alternatively, numerical values of quantization coefficients of which the numerical values are odd numbers in the target region may be converted into a first numerical value, and numerical values of quantization coefficients of which the numerical values are even numbers are converted into a second numerical value, and then, a sum of even number values of the quantization coefficients in the target region after the numerical value conversion is calculated, and the obtained sum is used as the statistical result, one of the first numerical value or the second numerical value being an odd number, and the other being an even number.

In conclusion, in an embodiment of the present disclosure, when the statistics of the quantization coefficients in the target region are collected according to the numerical values of the quantization coefficients in the target region in the quantization coefficient block, there are the following manners:

1. directly obtaining a sum of the numerical values of the quantization coefficients in the target region;
2. obtaining a sum of absolute values of the numerical values of the quantization coefficients in the target region;
3. first converting odd numbers and even numbers according to the parity of the quantization coefficients in the target region, and then obtaining a sum of all the converted numerical values in the target region;
4. counting a quantity of quantization coefficients of which numerical values are odd numbers in the target region;
5. obtaining a sum of the numerical values of the quantization coefficients of which the numerical values are odd numbers in the target region;
6. obtaining a sum of absolute values of the numerical values of the quantization coefficients of which the numerical values are odd numbers in the target region;

7. converting odd numbers and even numbers according to the parity of the quantization coefficients in the target region, and then obtaining a sum of odd numbers in all the converted numerical values in the target region;
8. counting a quantity of quantization coefficients of which numerical values are even numbers in the target region;
9. obtaining a sum of the numerical values of the quantization coefficients of which the numerical values are even numbers in the target region;
10. obtaining a sum of absolute values of the numerical values of the quantization coefficients of which the numerical values are even numbers in the target region; and
11. converting odd numbers and even numbers according to the parity of the quantization coefficients in the target region, and then obtaining a sum of even numbers in all the converted numerical values in the target region.

With regard to a specific position of the target region in the quantization coefficient block, in an embodiment of the present disclosure, the foregoing target region may be all regions in the quantization coefficient block.

In an embodiment of the present disclosure, the target region may be one or more designated positions in the quantization coefficient block.

Figure 7:
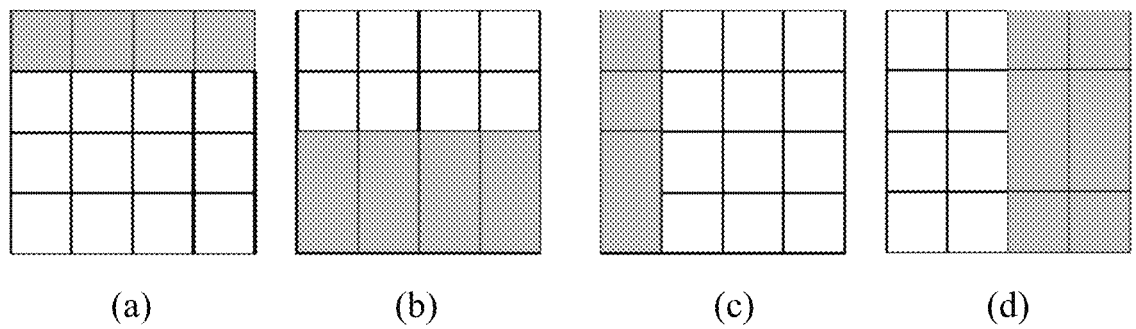
FIG. 7 is a schematic diagram of a manner of dividing a target region according to an embodiment of the present disclosure.

In an embodiment of the present disclosure, the target region may be at least one designated row in the quantization coefficient block. As shown in FIG. 7, assuming that the quantization coefficient block is a 4×4 coefficient block, and each block represents a quantization coefficient, as indicated by (a) in FIG. 7, one row of gray region is used as the target region. Alternatively, as indicated by (b) in FIG. 7, two rows of gray region are used as the target region. In some embodiments, the at least one row may be the uppermost row in the quantization coefficient block.

In an embodiment of the present disclosure, the target region may be at least one designated column in the quantization coefficient block. As shown in FIG. 7, assuming that the quantization coefficient block is a 4×4 coefficient block, and each block represents a quantization coefficient, as indicated by (c) in FIG. 7, one column of gray region is used as the target region. Alternatively, as indicated by (d) in FIG. 7, two columns of gray region are used as the target region. In some embodiments, the at least one column may be the leftmost column in the quantization coefficient block.

Figure 8:
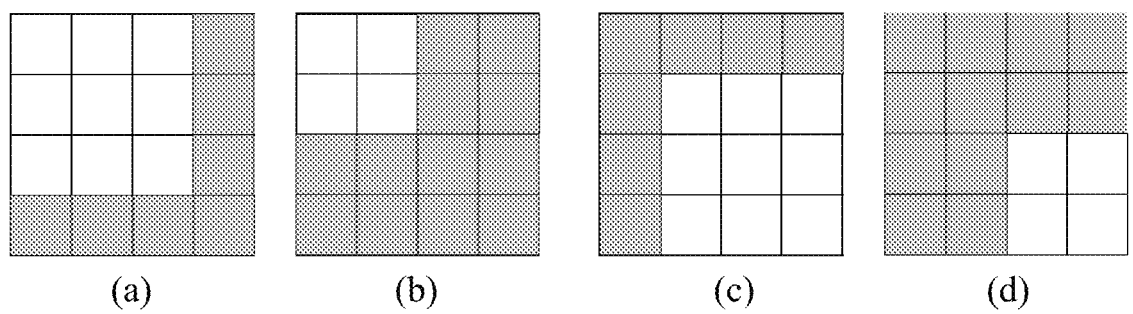
FIG. 8 is a schematic diagram of a manner of dividing a target region according to an embodiment of the present disclosure.

In an embodiment of the present disclosure, the target region may be at least one designated row and at least one designated column in the quantization coefficient block. As shown in FIG. 8, assuming that the quantization coefficient block is a 4×4 coefficient block, and each block represents a quantization coefficient, as indicated by (a) in FIG. 8, the lowermost one row and the rightmost one column (that is, the gray region therein) are used as the target region. Alternatively, as indicated by (d) in FIG. 8, the lowermost two rows and the rightmost two columns (that is, the gray region therein) are used as the target region. Alternatively, as indicated by (c) in FIG. 8, the uppermost one row and the leftmost one column (that is, the gray region therein) are used as the target region. Alternatively, as indicated by (d) in FIG. 8, the uppermost two rows and the leftmost two columns (that is, the gray region therein) are used as the target region.

Figure 9:
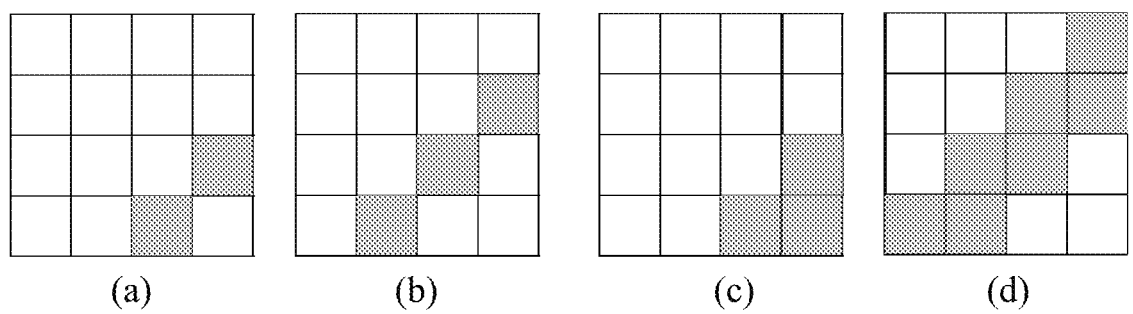
FIG. 9 is a schematic diagram of a manner of dividing a target region according to an embodiment of the present disclosure.

In an embodiment of the present disclosure, the target region may be a position on at least one oblique line in the quantization coefficient block. As shown in FIG. 9, assuming that the quantization coefficient block is a 4×4 coefficient block, and each block represents a quantization coefficient, as indicated by (a) and (b) in FIG. 9, a position on one oblique line is used as the target region. Alternatively, as indicated by (c) and (d) in FIG. 9, positions on two oblique lines are used as the target region.

In an embodiment of the present disclosure, the target region may be an SRCC region in the quantization coefficient block. The SRCC region is a scan region marked by using an SRCC technology.

In an embodiment of the present disclosure, the target region may be one or more designated positions in the SRCC region. In some embodiments, the one or more designated positions in the SRCC region may include first N positions according to a scanning order, N being a non-zero natural number.

In an embodiment of the present disclosure, the target region may be at least one designated row in the SRCC region. As shown in FIG. 7, assuming that the SRCC region is a 4×4 coefficient block, and each block represents a quantization coefficient, as indicated by (a) in FIG. 7, one row of gray region is used as the target region. Alternatively, as indicated by (b) in FIG. 7, two rows of gray region are used as the target region. In some embodiments, the at least one row may be the uppermost row in the quantization coefficient block.

In an embodiment of the present disclosure, the target region may be at least one designated column in the SRCC region. As shown in FIG. 7, assuming that the SRCC region is a 4×4 coefficient block, and each block represents a quantization coefficient, as indicated by (c) in FIG. 7, one column of gray region is used as the target region. Alternatively, as indicated by (d) in FIG. 7, two columns of gray region are used as the target region. In some embodiments, the at least one column may be the leftmost column in the quantization coefficient block.

In an embodiment of the present disclosure, the target region may be at least one designated row and at least one designated column in the SRCC region. As shown in FIG. 8, assuming that the SRCC region is a 4×4 coefficient block, and each block represents a quantization coefficient, as indicated by (a) in FIG. 8, the lowermost one row and the rightmost one column (that is, the gray region therein) are used as the target region. Alternatively, as indicated by (d) in FIG. 8, the lowermost two rows and the rightmost two columns (that is, the gray region therein) are used as the target region. Alternatively, as indicated by (c) in FIG. 8, the uppermost one row and the leftmost one column (that is, the gray region therein) are used as the target region. Alternatively, as indicated by (d) in FIG. 8, the uppermost two rows and the leftmost two columns (that is, the gray region therein) are used as the target region.

In an embodiment of the present disclosure, the target region may be a position on at least one oblique line in the SRCC region. As shown in FIG. 9, assuming that the SRCC region is a 4×4 coefficient block, and each block represents a quantization coefficient, as indicated by (a) and (b) in FIG. 9, a position on one oblique line is used as the target region. Alternatively, as indicated by (c) and (d) in FIG. 9, positions on two oblique lines are used as the target region.

In another embodiment of the present disclosure, division manners of the target region in the foregoing embodiment may also be combined, so that a combined region is used as the target region.

Reference is made to FIG. 6 again. Step S630: Select a transform matrix combination corresponding to the quantization coefficient statistical value.

In one embodiment, the decoder side determines the transform matrix combination corresponding to the code block based on the parity of the quantization coefficient statistical value. Correspondingly, during encoding, the encoder side adjusts the parity of the quantization coefficient statistical value by adjusting the quantization parameters in the target region in the quantization parameter block based on the transform matrix combination of the code block, thereby implicitly indicating the transform matrix combination.

in an embodiment of the present disclosure, the transform matrix combination may be selected according to the parity of the quantization coefficient statistical value. For example, a first transform matrix combination is selected when the quantization coefficient statistical value is an odd number, and a second transform matrix combination different from the first transform matrix combination is selected when the quantization coefficient statistical value is an even number. Alternatively, the first transform matrix combination is selected when the quantization coefficient statistical value is an odd number, and the first transform matrix combination is selected when the quantization coefficient statistical value is an even number. In some embodiments, the first transform matrix combination and the second transform matrix combination can be any one of (DCT2, DCT2), (DCT8, DCT8), (DCT8, DST7), (DST7, DCT8), and (DST7, DST7), but the first transform matrix combination and second transform matrix combination are not the same.

In another embodiment, the decoder side determines the transform matrix combination corresponding to the code block based on the numerical value of the quantization coefficient statistical value. Correspondingly, during encoding, the encoder side adjusts the numerical value of the quantization coefficient statistical value by adjusting the quantization parameters in the target region in the quantization parameter block based on the transform matrix combination of the code block, thereby implicitly indicating the transform matrix combination. Compared with using the parity for indication, using a numerical value can achieve more refined indication of the transform matrix combination, but the complexity of encoding on the encoder side is correspondingly increased.

In an embodiment of the present disclosure, the transform matrix combination may be selected according to the numerical value of the quantization coefficient statistical value. For example, a first transform matrix combination is selected when the quantization coefficient statistical value belongs to a first numerical value set; otherwise, a second transform matrix combination different from the first transform matrix combination is selected. Alternatively, the second transform matrix combination is selected when the quantization coefficient statistical value belongs to the first numerical value set; otherwise, the first transform matrix combination is selected. In some embodiments, the first transform matrix combination and the second transform matrix combination can be any one of (DCT2, DCT2), (DCT8, DCT8), (DCT8, DST7), (DST7, DCT8), and (DST7, DST7), but the first transform matrix combination and second transform matrix combination are not the same.

In a specific example of the present disclosure, it is assumed that when the quantization coefficient statistical value belongs to a first numerical value set, (DCT2, DCT2) is selected, and when the quantization coefficient statistical value does not belong to the first numerical value set, (DST7, DST7) is selected. In addition, it is assumed that the quantization coefficient statistical value is a remainder of a statistical result of the quantization coefficients against 4 (the numerical value is only an example), and the first numerical value set is (0, 1, 2), then (DCT2, DCT2) can be selected when the quantization coefficient statistical value is 2. (DST7, DST7) may be selected when the quantization coefficient statistical value is 3.

Similarly, it is assumed that when the quantization coefficient statistical value belongs to a first numerical value set, (DST7, DST7) is selected, and when the quantization coefficient statistical value does not belong to the first numerical value set, (DCT2, DCT2) is selected. In addition, it is assumed that the quantization coefficient statistical value is a remainder of a statistical result of the quantization coefficients against 4 (the numerical value is only an example), and the first numerical value set is (0, 1, 2), then (DST7, DST7) can be selected when the quantization coefficient statistical value is 2. (DCT2, DCT2) may be selected when the quantization coefficient statistical value is 3.

Reference is made to FIG. 6 again. Step S640: Perform inverse transform processing on an inverse quantization result of the quantization coefficient block based on the selected transform matrix combination, to obtain reconstructed residual data. The reconstructed residual data is used for video image reconstruction, in other words, used in decoding the video bitstream data to obtain a decoded video. For example, the reconstructed residual data/signal can be combined with predicted data/signal corresponding to a coding unit to obtain reconstructed data/signal corresponding to the CU. For this process, reference may be made to the related descriptions in the foregoing embodiments, and details are not described again.

In the technical solutions provided by some embodiments of the present disclosure, the transform matrix combination corresponding to the code block can be implicitly indicated by using the quantization coefficients in the quantization coefficient block without requiring an encoder side to encode a transform matrix index for each coding unit, which reduces bits occupied by the transform matrix index, thereby effectively improving the video encoding efficiency.

The following introduces the apparatus embodiment of the present disclosure, which can be used for performing the video decoding method in the foregoing embodiments of the present disclosure. For details not disclosed in the apparatus embodiment of the present disclosure, reference may be made to the foregoing embodiments of the video decoding method in the present disclosure.

Figure 10:
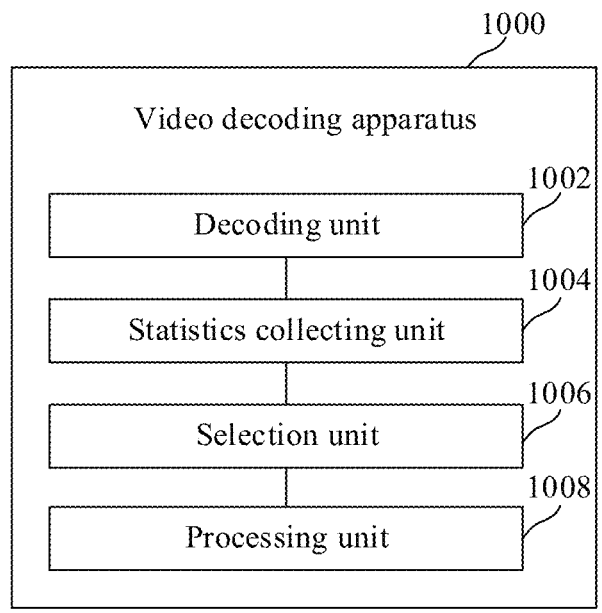
FIG. 10 is a block diagram of a video decoding apparatus according to an embodiment of the present disclosure.

FIG. 10 is a block diagram of a video decoding apparatus according to an embodiment of the present disclosure. The video decoding apparatus may be configured in a device with computing and processing functions, for example, may be configured in a terminal device or a server.

Referring to FIG. 10, a video decoding apparatus 1000 according to an embodiment of the present disclosure includes: a decoding unit 1002, a statistics collecting unit 1004, a selection unit 1006, and a processing unit 1008.

The decoding unit 1002 is configured to perform entropy decoding processing on a code block of a video image frame, to obtain a quantization coefficient block of residual data corresponding to the code block. The statistics collecting unit 1004 is configured to collect statistics of quantization coefficients in a target region in the quantization coefficient block, to obtain a quantization coefficient statistical value. The selection unit 1006 is configured to select a transform matrix combination corresponding to the quantization coefficient statistical value. The processing unit 1008 is configured to perform inverse transform processing on an inverse quantization result of the quantization coefficient block based on the selected transform matrix combination, to obtain reconstructed residual data, the reconstructed residual data being used for video image reconstruction.

In some embodiments of the present disclosure, based on the foregoing solution, the video decoding apparatus 1000 further includes a first determining unit, configured to determine, when a sequence header of first encoded data corresponding to a video image frame sequence includes a specified index identifier, that the transform matrix combination needs to be selected for code blocks in the first encoded data according to the quantization coefficients in the quantization coefficient block.

In some embodiments of the present disclosure, based on the foregoing solution, the video decoding apparatus 1000 further includes a second determining unit, configured to determine, when an image header of second encoded data corresponding to the video image frame includes a specified index identifier, that the transform matrix combination needs to be selected for code blocks in the second encoded data according to the quantization coefficients in the quantization coefficient block.

In some embodiments of the present disclosure, based on the foregoing solution, the video decoding apparatus 1000 further includes a third determining unit, configured to determine, when slice header information of third encoded data corresponding to a slice in the video image frame includes a specified index identifier, that the transform matrix combination needs to be selected for code blocks in the third encoded data according to the quantization coefficients in the quantization coefficient block.

In some embodiments of the present disclosure, based on the foregoing solution, the video decoding apparatus 1000 further includes a fourth determining unit, configured to determine, when LCU header information of fourth encoded data corresponding to a largest coding unit LCU in the video image frame includes a specified index identifier, that the transform matrix combination needs to be selected for code blocks in the fourth encoded data according to the quantization coefficients in the quantization coefficient block.

In some embodiments of the present disclosure, based on the foregoing solution, the video decoding apparatus 1000 further includes a fifth determining unit, configured to determine, when a size of the code block is less than a threshold, that the transform matrix combination needs to be selected for the code blocks according to the quantization coefficients in the quantization coefficient block.

In some embodiments of the present disclosure, based on the foregoing solution, the video decoding apparatus 1000 further includes a sixth determining unit, configured to determine, when an index identifier included in a sequence header of first encoded data corresponding to a video image frame sequence is a first value, that the transform matrix combination does not need to be selected for code blocks in the first encoded data according to the quantization coefficients in the quantization coefficient block; and determine, when the index identifier included in the sequence header is a second value, and an index identifier included in an image header of second encoded data corresponding to the video image frame in the video image frame sequence is the first value, that the transform matrix combination does not need to be selected for code blocks in the second encoded data according to the quantization coefficients in the quantization coefficient block.

In some embodiments of the present disclosure, based on the foregoing solution, the sixth determining unit is further configured to determine, when the index identifier included in the sequence header is the second value, and the index identifier included in the image header is the second value, that the transform matrix combination needs to be selected for code blocks in the second encoded data according to the quantization coefficients in the quantization coefficient block.

In some embodiments of the present disclosure, based on the foregoing solution, the sixth determining unit is further configured to determine, when the index identifier included in the sequence header is the second value, the index identifier included in the image header is the second value, and an index identifier included in slice header information of third encoded data corresponding to a slice in the video image frame is the first value, that the transform matrix combination does not need to be selected for code blocks in the third encoded data according to the quantization coefficients in the quantization coefficient block.

In some embodiments of the present disclosure, based on the foregoing solution, the sixth determining unit is further configured to determine, when the index identifier included in the sequence header is the second value, the index identifier included in the image header is the second value, and the index identifier included in the slice header information is the second value, that the transform matrix combination needs to be selected for code blocks in the third encoded data according to the quantization coefficients in the quantization coefficient block.

In some embodiments of the present disclosure, based on the foregoing solution, the sixth determining unit is further configured to determine, when the index identifier included in the sequence header is the second value, the index identifier included in the image header is the second value, the index identifier included in the slice header information is the second value, and an index identifier included in LCU header information of fourth encoded data corresponding to an LCU in the slice is the first value, that the transform matrix combination does not need to be selected for code blocks in the fourth encoded data according to the quantization coefficients in the quantization coefficient block.

In some embodiments of the present disclosure, based on the foregoing solution, the sixth determining unit is further configured to determine, when the index identifier included in the sequence header is the second value, the index identifier included in the image header is the second value, the index identifier included in the slice header information is the second value, and the index identifier included in the LCU header information is the second value, that the transform matrix combination needs to be selected for code blocks in the fourth encoded data according to the quantization coefficients in the quantization coefficient block.

In some embodiments of the present disclosure, based on the foregoing solution, the sixth determining unit is further configured to determine, when the index identifier included in the sequence header is the second value, the index identifier included in the image header is the second value, the index identifier included in the slice header information is the second value, and the index identifier included in the LCU header information is the second value, that the transform matrix combination needs to be selected for code blocks in the fourth encoded data according to the quantization coefficients in the quantization coefficient block. Alternatively, the sixth determining unit is further configured to determine, when the index identifier included in the sequence header is the second value, the index identifier included in the image header is the second value, the index identifier included in the slice header information is the second value, and the index identifier included in the LCU header information is the second value, whether the transform matrix combination needs to be selected for the code blocks according to the quantization coefficients in the quantization coefficient block.

In some embodiments of the present disclosure, based on the foregoing solution, the statistics collecting unit 1004 is configured to collect statistics of the quantization coefficients in the target region according to numerical values of the quantization coefficients in the target region in the quantization coefficient block, to obtain a statistical result, and use the statistical result as the quantization coefficient statistical value; or calculate a remainder of the statistical result against a set value, and use the remainder as the quantization coefficient statistical value.

In some embodiments of the present disclosure, based on the foregoing solution, the statistics collecting unit 1004 is configured to calculate, according to the numerical values of the quantization coefficients in the target region, a sum of the numerical values of the quantization coefficients in the target region, and use the obtained sum as the statistical result; or calculate, according to the numerical values of the quantization coefficients in the target region in the quantization coefficient block, a sum of absolute values of the quantization coefficients in the target region, and use the obtained sum as the statistical result; or convert, according to the numerical values of the quantization coefficients in the target region, numerical values of quantization coefficients of which the numerical values are odd numbers in the target region into a first numerical value, convert numerical values of quantization coefficients of which the numerical values are even numbers in the target region into a second numerical value, calculate a sum of numerical values of the quantization coefficients in the target region after the numerical value conversion, and use the obtained sum as the statistical result, one of the first numerical value or the second numerical value being an odd number, and the other being an even number.

In some embodiments of the present disclosure, based on the foregoing solution, the statistics collecting unit 1004 is configured to use a quantity of quantization coefficients of which numerical values are odd numbers in the target region as the statistical result; or calculate, according to the numerical values of the quantization coefficients in the target region, a sum of the numerical values of the quantization coefficients of which the numerical values are odd numbers in the target region, and use the obtained sum as the statistical result; or calculate, according to the numerical values of the quantization coefficients in the target region, a sum of absolute values of the quantization coefficients of which the numerical values are odd numbers in the target region, and use the obtained sum as the statistical result; or convert, according to the numerical values of the quantization coefficients in the target region, numerical values of quantization coefficients of which the numerical values are odd numbers in the target region into a first numerical value, convert numerical values of quantization coefficients of which the numerical values are even numbers in the target region into a second numerical value, calculate a sum of odd number values of the quantization coefficients in the target region after the numerical value conversion, and use the obtained sum as the statistical result, one of the first numerical value or the second numerical value being an odd number, and the other being an even number.

In some embodiments of the present disclosure, based on the foregoing solution, the statistics collecting unit 1004 is configured to use a quantity of quantization coefficients of which numerical values are even numbers in the target region as the statistical result; or calculate, according to the numerical values of the quantization coefficients in the target region, a sum of the numerical values of the quantization coefficients of which the numerical values are even numbers in the target region, and use the obtained sum as the statistical result; or calculate, according to the numerical values of the quantization coefficients in the target region, a sum of absolute values of the quantization coefficients of which the numerical values are even numbers in the target region, and use the obtained sum as the statistical result; or convert, according to the numerical values of the quantization coefficients in the target region, numerical values of quantization coefficients of which the numerical values are odd numbers in the target region into a first numerical value, convert numerical values of quantization coefficients of which the numerical values are even numbers in the target region into a second numerical value, calculate a sum of even number values of the quantization coefficients in the target region after the numerical value conversion, and use the obtained sum as the statistical result, one of the first numerical value or the second numerical value being an odd number, and the other being an even number.

In some embodiments of the present disclosure, based on the foregoing solution, the target region includes any one of the following:
- all regions in the quantization coefficient block;
- one or more designated positions in the quantization coefficient block;
- at least one designated row in the quantization coefficient block;
- at least one designated column in the quantization coefficient block;
- at least one designated row and at least one designated column in the quantization coefficient block; or
- a position on at least one oblique line in the quantization coefficient block.

In some embodiments of the present disclosure, based on the foregoing solution, the target region includes any one of the following:
- an SRCC region in the quantization coefficient block;
- one or more designated positions in the SRCC region;
- at least one designated row in the SRCC region;
- at least one designated column in the SRCC region;
- at least one designated row and at least one designated column in the SRCC region; or
- a position on at least one oblique line in the SRCC region.

In some embodiments of the present disclosure, based on the foregoing solution, the one or more designated positions in the SRCC region includes first N positions according to a scanning order, N being a non-zero natural number.

In some embodiments of the present disclosure, based on the foregoing solution, the selection unit 1006 is configured to select a first transform matrix combination when the quantization coefficient statistical value is an odd number, and select a second transform matrix combination different from the first transform matrix combination when the quantization coefficient statistical value is an even number; or select the first transform matrix combination when the quantization coefficient statistical value is an odd number, and select the first transform matrix combination when the quantization coefficient statistical value is an even number.

In some embodiments of the present disclosure, based on the foregoing solution, the selection unit 1006 is configured to select a first transform matrix combination when the quantization coefficient statistical value belongs to a first numerical value set, and select a second transform matrix combination different from the first transform matrix combination when the quantization coefficient statistical value does not belong to the first numerical value set; or select the second transform matrix combination when the quantization coefficient statistical value belongs to the first numerical value set, and select the first transform matrix combination when the quantization coefficient statistical value does not belong to the first numerical value set.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 11:
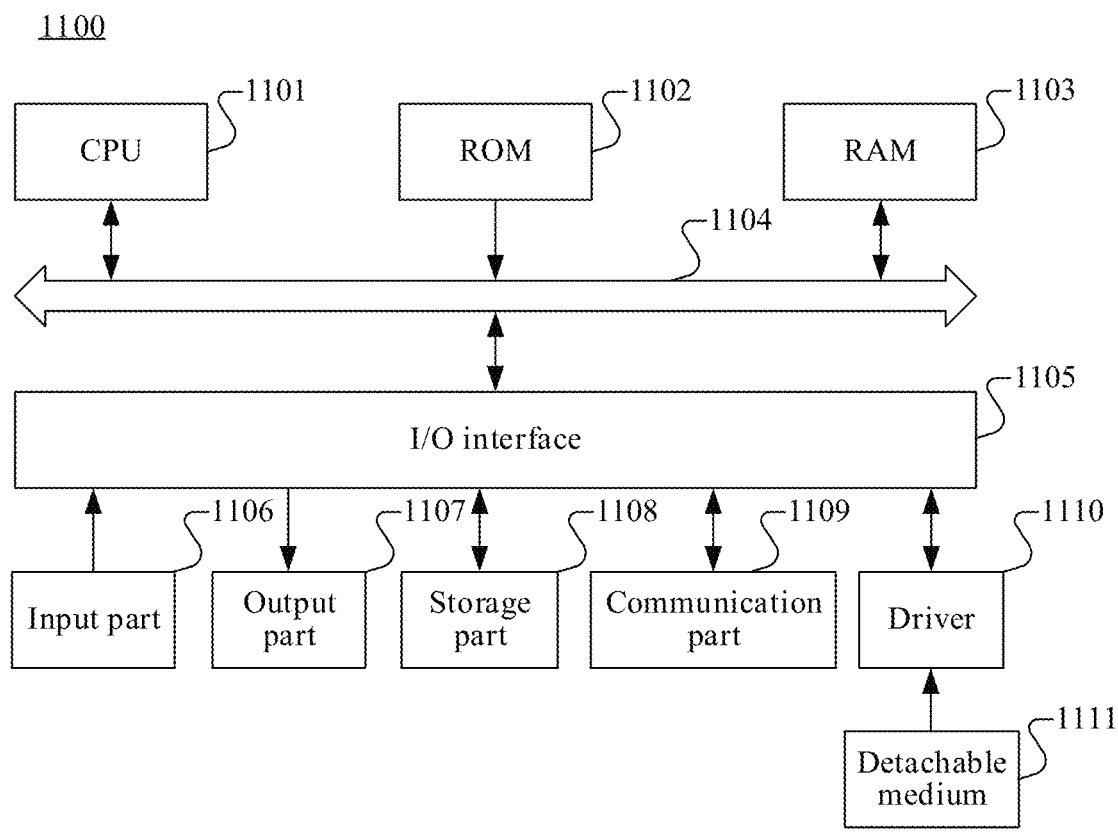
FIG. 11 is a schematic structural diagram of a computer system adapted to implement an electronic device according to an embodiment of the present disclosure.

FIG. 11 is a schematic structural diagram of a computer system adapted to implement an electronic device according to an embodiment of the present disclosure.

The computer system 1100 of the electronic device shown in FIG. 11 is merely an example, and does not constitute any limitation on functions and use ranges of the embodiments of the present disclosure.

As shown in FIG. 11, the computer system 1100 includes a central processing unit (CPU) 1101 that can perform various appropriate actions and processes, for example, perform the methods described in the foregoing embodiments, according to a program stored in a read-only memory (ROM) 1102 or a program loaded into a random access memory (RAM) 1103 from a storage part 1108. The RAM 1103 further stores various programs and data required for operating the system. The CPU 1101, the ROM 1102, and the RAM 1103 are connected to each other through a bus 1104. An input/output (I/O) interface 1105 is also connected to the bus 1104.

The following components are connected to the I/O interface 1105 includes an input part 1106 including a keyboard, a mouse, or the like; an output part 1107 including a cathode ray tube (CRT), a liquid crystal display (LCD), a speaker, or the like; a storage part 1108 including hard disk, or the like; and a communication part 1109 including a network interface card such as a local area network (LAN) card, a modem, or the like. The communication part 1109 performs communication processing by using a network such as the Internet. A driver 1110 is also connected to the I/O interface 1105 as required. A removable medium 1111, such as a magnetic disk, an optical disc, a magneto-optical disk, or a semiconductor memory, is installed on the driver 1110 as required, so that a computer program read from the removable medium is installed into the storage part 1108 as required.

Particularly, according to an embodiment of the present disclosure, the processes described in the following by referring to the flowcharts may be implemented as computer software programs. For example, an embodiment of the present disclosure includes a computer program product. The computer program product includes a computer program stored in a computer-readable medium. The computer program includes a computer program used for performing a method shown in the flowchart. In such an embodiment, the computer program may be downloaded and installed through the communication part 1109 from a network, and/or installed from the removable medium 1111. When the computer program is executed by the CPU 1101, the various functions defined in the system of the present disclosure are executed.

The computer-readable medium shown in the embodiments of the present disclosure may be a computer-readable signal medium or a computer-readable storage medium or any combination of two. The computer-readable storage medium may be, for example, but is not limited to, an electrical, magnetic, optical, electromagnetic, infrared, or semiconductor system, apparatus, or device, or any combination thereof. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In the present disclosure, the computer-readable storage medium may be any tangible medium containing or storing a program, and the program may be used by or used in combination with an instruction execution system, an apparatus, or a device. In the present disclosure, a computer-readable signal medium may include a data signal in a baseband or propagated as a part of a carrier wave, the data signal carrying a computer-readable program. A data signal propagated in such a way may assume a plurality of forms, including, but not limited to, an electromagnetic signal, an optical signal, or any appropriate combination thereof. The computer-readable signal medium may be further any computer readable medium in addition to a computer-readable storage medium. The computer readable medium may send, propagate, or transmit a program that is used by or used in combination with an instruction execution system, apparatus, or device. The computer program included in the computer-readable medium may be transmitted by using any suitable medium, including but not limited to: a wireless medium, a wire, or the like, or any suitable combination thereof.

A related unit described in the embodiments of the present disclosure may be implemented in a software manner, or may be implemented in a hardware manner, and the unit described may also be set in a processor. Names of the units do not constitute a limitation on the units in a specific case.

In another aspect, the present disclosure further provides a computer readable medium. The computer readable medium may be included in the electronic device described in the above embodiments, or may exist alone without being assembled into the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. Actually, according to the implementations of the present disclosure, the features and functions of two or more modules or units described above may be specifically implemented in one module or unit. Conversely, features and functions of one module or unit described above may be further divided into a plurality of modules or units for implementation.

Through the descriptions of the foregoing implementations, a person skilled in the art easily understands that the exemplary implementations described herein may be implemented through software, or may be implemented through software located in combination with necessary hardware. Therefore, the technical solutions of the embodiments of the present disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of the present disclosure.

After considering the specification and practicing the disclosed embodiments, a person skilled in the art may easily conceive of other implementations of the present disclosure. The present disclosure is intended to cover any variations, uses or adaptive changes of the present disclosure. Such variations, uses or adaptive changes follow the general principles of the present disclosure, and include well-known knowledge and conventional technical means in the art that are not disclosed in the present disclosure.

It is to be understood that the present disclosure is not limited to the precise structures described above and shown in the accompanying drawings, and various modifications and changes can be made without departing from the scope of the present disclosure. The scope of the present disclosure is limited by the appended claims only.

What is claimed is:

1. A video decoding method, comprising:
    performing entropy decoding processing on a code block of a video image frame of a video image frame sequence, to obtain a quantization coefficient block of residual data corresponding to the code block;
    collecting statistics of quantization coefficients in a target region in the quantization coefficient block, to obtain a quantization coefficient statistical value, comprising:
        performing a numerical value conversion according to numerical values of the quantization coefficients in the target region, including: converting the numerical values that are odd numbers into a first numerical value, converting the numerical values that are even numbers into a second numerical value, one of the first numerical value and the second numerical value being an even number, and the other one of the first numerical value and the second numerical value being an odd number;
        calculating a sum of odd number values or a sum of even number values of the quantization coefficients in the target region after the numerical value conversion, and using the obtained sum as a statistical result; and
        determining the quantization coefficient statistical value based on the statistical result;
    selecting a transform matrix combination corresponding to the quantization coefficient statistical value based on a parity of the quantization coefficient statistical value; and
    performing inverse transform processing on an inverse quantization result of the quantization coefficient block based on the selected transform matrix combination, to obtain reconstructed residual data, the reconstructed residual data being used for video image reconstruction.

2. The video decoding method according to claim 1, further comprising at least one of:
    determining, when a sequence header of first encoded data corresponding to the video image frame sequence comprises a specified index identifier, that the transform matrix combination needs to be selected for code blocks in the first encoded data according to the quantization coefficients in the quantization coefficient block;
    determining, when an image header of second encoded data corresponding to the video image frame comprises a specified index identifier, that the transform matrix combination needs to be selected for code blocks in the second encoded data according to the quantization coefficients in the quantization coefficient block;
    determining, when slice header information of third encoded data corresponding to a slice in the video image frame comprises a specified index identifier, that the transform matrix combination needs to be selected for code blocks in the third encoded data according to the quantization coefficients in the quantization coefficient block; or
    determining, when LCU header information of fourth encoded data corresponding to a largest coding unit LCU in the video image frame comprises a specified index identifier, that the transform matrix combination needs to be selected for code blocks in the fourth encoded data according to the quantization coefficients in the quantization coefficient block.

3. The video decoding method according to claim 1, further comprising:
    determining, when a size of the code block is less than a threshold, that the transform matrix combination needs to be selected for the code blocks according to the quantization coefficients in the quantization coefficient block.

4. The video decoding method according to claim 1, further comprising:
    determining, when an index identifier comprised in a sequence header of first encoded data corresponding to the video image frame sequence is a first value, that the transform matrix combination does not need to be selected for code blocks in the first encoded data according to the quantization coefficients in the quantization coefficient block;
    determining, when the index identifier comprised in the sequence header is a second value, and an index identifier comprised in an image header of second encoded data corresponding to the video image frame in the video image frame sequence is the first value, that the transform matrix combination does not need to be selected for code blocks in the second encoded data according to the quantization coefficients in the quantization coefficient block; or
    determining, when the index identifier comprised in the sequence header is the second value, and the index identifier comprised in the image header is the second value, that the transform matrix combination needs to be selected for code blocks in the second encoded data according to the quantization coefficients in the quantization coefficient block.

5. The video decoding method according to claim 4, further comprising:
    determining, when the index identifier comprised in the sequence header is the second value, the index identifier comprised in the image header is the second value, and an index identifier comprised in slice header information of third encoded data corresponding to a slice in the video image frame is the first value, that the transform matrix combination does not need to be selected for code blocks in the third encoded data according to the quantization coefficients in the quantization coefficient block; or determining, when the index identifier comprised in the sequence header is the second value, the index identifier comprised in the image header is the second value, and the index identifier comprised in the slice header information is the second value, that the transform matrix combination needs to be selected for code blocks in the third encoded data according to the quantization coefficients in the quantization coefficient block.

6. The video decoding method according to claim 5, further comprising:

determining, when the index identifier comprised in the sequence header is the second value, the index identifier comprised in the image header is the second value, the index identifier comprised in the slice header information is the second value, and an index identifier comprised in LCU header information of fourth encoded data corresponding to an LCU in the slice is the first value, that the transform matrix combination does not need to be selected for code blocks in the fourth encoded data according to the quantization coefficients in the quantization coefficient block; or determining, when the index identifier comprised in the sequence header is the second value, the index identifier comprised in the image header is the second value, the index identifier comprised in the slice header information is the second value, and the index identifier comprised in the LCU header information is the second value, that the corresponding transform matrix combination needs to be selected for code blocks in the fourth encoded data according to the quantization coefficients in the quantization coefficient block obtained through entropy decoding.

7. The video decoding method according to claim 6, further comprising:

determining, when the index identifier comprised in the sequence header is the second value, the index identifier comprised in the image header is the second value, the index identifier comprised in the slice header information is the second value, and the index identifier comprised in the LCU header information is the second value, that the transform matrix combination needs to be selected for code blocks in the fourth encoded data according to the quantization coefficients in the quantization coefficient block; or determining, when the index identifier comprised in the sequence header is the second value, the index identifier comprised in the image header is the second value, the index identifier comprised in the slice header information is the second value, and the index identifier comprised in the LCU header information is the second value, whether the transform matrix combination needs to be selected for the code blocks according to the quantization coefficients in the quantization coefficient block.

8. The video decoding method according to claim 1, wherein the collecting statistics of quantization coefficients in a target region in the quantization coefficient block, to obtain a quantization coefficient statistical value comprises:

using the statistical result as the quantization coefficient statistical value, or calculating a remainder of the statistical result against a set value, and using the remainder as the quantization coefficient statistical value.

9. The video decoding method according to claim 1, wherein the target region comprises one of:
all regions in the quantization coefficient block;
one or more designated positions in the quantization coefficient block;
at least one designated row in the quantization coefficient block;
at least one designated column in the quantization coefficient block;
at least one designated row and at least one designated column in the quantization coefficient block; and
a position on at least one oblique line in the quantization coefficient block.

10. The video decoding method according to claim 1, wherein the target region comprises one of:
a scan region coefficient coding (SRCC) region in the quantization coefficient block;
one or more designated positions in the SRCC region;
at least one designated row in the SRCC region;
at least one designated column in the SRCC region;
at least one designated row and at least one designated column in the SRCC region; and
a position on at least one oblique line in the SRCC region.

11. The video decoding method according to claim 10, wherein the one or more designated positions in the SRCC region comprises first N positions according to a scanning order, N being a non-zero natural number.

12. The video decoding method according to claim 1, wherein the selecting a transform matrix combination corresponding to the quantization coefficient statistical value comprises:
selecting a first transform matrix combination when the quantization coefficient statistical value is an odd number; and selecting a second transform matrix combination different from the first transform matrix combination when the quantization coefficient statistical value is an even number; or
selecting the second transform matrix combination when the quantization coefficient statistical value is an odd number; and selecting the first transform matrix combination when the quantization coefficient statistical value is an even number.

13. The video decoding method according to claim 1, wherein the selecting a transform matrix combination corresponding to the quantization coefficient statistical value comprises:
selecting a first transform matrix combination when the quantization coefficient statistical value belongs to a first numerical value set; and selecting a second transform matrix combination different from the first transform matrix combination when the quantization coefficient statistical value does not belong to the first numerical value set; or
selecting the second transform matrix combination when the quantization coefficient statistical value belongs to the first numerical value set; and selecting the first transform matrix combination when the quantization coefficient statistical value does not belong to the first numerical value set.

14. A video decoding apparatus, comprising: a memory and a processor coupled to the memory, the processor being configured to implement:
performing entropy decoding processing on a code block of a video image frame of a video image frame sequence, to obtain a quantization coefficient block of residual data corresponding to the code block;

collecting statistics of quantization coefficients in a target region in the quantization coefficient block, to obtain a quantization coefficient statistical value, comprising:
  performing a numerical value conversion according to numerical values of the quantization coefficients in the target region, including: converting the numerical values that are odd numbers into a first numerical value, converting the numerical values that are even numbers into a second numerical value, one of the first numerical value and the second numerical value being an even number, and the other one of the first numerical value and the second numerical value being an odd number;
  calculating a sum of odd number values or a sum of even number values of the quantization coefficients in the target region after the numerical value conversion, and using the obtained sum as a statistical result; and
  determining the quantization coefficient statistical value based on the statistical result;
selecting a transform matrix combination corresponding to the quantization coefficient statistical value based on a parity of the quantization coefficient statistical value; and
performing inverse transform processing on an inverse quantization result of the quantization coefficient block based on the selected transform matrix combination, to obtain reconstructed residual data, the reconstructed residual data being used for video image reconstruction.

15. The apparatus according to claim 14, wherein the processor is further configured to perform at least one of:
  determining, when a sequence header of first encoded data corresponding to the video image frame sequence comprises a specified index identifier, that the transform matrix combination needs to be selected for code blocks in the first encoded data according to the quantization coefficients in the quantization coefficient block;
  determining, when an image header of second encoded data corresponding to the video image frame comprises a specified index identifier, that the transform matrix combination needs to be selected for code blocks in the second encoded data according to the quantization coefficients in the quantization coefficient block;
  determining, when slice header information of third encoded data corresponding to a slice in the video image frame comprises a specified index identifier, that the transform matrix combination needs to be selected for code blocks in the third encoded data according to the quantization coefficients in the quantization coefficient block; or
  determining, when LCU header information of fourth encoded data corresponding to a largest coding unit LCU in the video image frame comprises a specified index identifier, that the transform matrix combination needs to be selected for code blocks in the fourth encoded data according to the quantization coefficients in the quantization coefficient block.

16. The apparatus according to claim 14, wherein the processor is further configured to perform:
  determining, when a size of the code block is less than a threshold, that the transform matrix combination needs to be selected for the code blocks according to the quantization coefficients in the quantization coefficient block.

17. A non-transitory computer-readable medium, storing a computer program, the computer program, when executed by a processor, cause the processor to implement:
  performing entropy decoding processing on a code block of a video image frame of a video image frame sequence, to obtain a quantization coefficient block of residual data corresponding to the code block;
  collecting statistics of quantization coefficients in a target region in the quantization coefficient block, to obtain a quantization coefficient statistical value, comprising:
    performing a numerical value conversion according to numerical values of the quantization coefficients in the target region, including: converting the numerical values that are odd numbers into a first numerical value, converting the numerical values that are even numbers into a second numerical value, one of the first numerical value and the second numerical value being an even number, and the other one of the first numerical value and the second numerical value being an odd number;
    calculating a sum of odd number values or a sum of even number values of the quantization coefficients in the target region after the numerical value conversion, and using the obtained sum as a statistical result; and
    determining the quantization coefficient statistical value based on the statistical result;
  selecting a transform matrix combination corresponding to the quantization coefficient statistical value based on a parity of the quantization coefficient statistical value; and
  performing inverse transform processing on an inverse quantization result of the quantization coefficient block based on the selected transform matrix combination, to obtain reconstructed residual data, the reconstructed residual data being used for video image reconstruction.

* * * * *